US009819946B2

(12) United States Patent
Taubman et al.

(10) Patent No.: US 9,819,946 B2
(45) Date of Patent: Nov. 14, 2017

(54) METHOD AND APPARATUS FOR CODING OF SPATIAL DATA

(71) Applicant: NewSouth Innovations Pty Limited, Sydney, New South Wales (AU)

(72) Inventors: David Scott Taubman, New South Wales (AU); Reji Kuruvilla Mathew, New South Wales (AU); Pietro Zanuttigh, Padua (IT)

(73) Assignee: NewSouth Innovations Pty Limited, Sydney, New South Wales (AU)

( * ) Notice: Subject to any disclaimer, the term of this patent is extended or adjusted under 35 U.S.C. 154(b) by 422 days.

(21) Appl. No.: 14/390,919

(22) PCT Filed: Apr. 5, 2013

(86) PCT No.: PCT/AU2013/000359
§ 371 (c)(1),
(2) Date: Oct. 6, 2014

(87) PCT Pub. No.: WO2013/149307
PCT Pub. Date: Oct. 10, 2013

(65) Prior Publication Data
US 2015/0078435 A1 Mar. 19, 2015

(30) Foreign Application Priority Data
Apr. 5, 2012 (AU) ................. 2012901372

(51) Int. Cl.
*H04N 19/96* (2014.01)
*H04N 19/176* (2014.01)
(Continued)

(52) U.S. Cl.
CPC ............ *H04N 19/176* (2014.11); *G06T 9/00* (2013.01); *H04N 19/167* (2014.11); *H04N 19/60* (2014.11); *H04N 19/597* (2014.11)

(58) Field of Classification Search
CPC ... G06T 9/20; G06T 9/40; G06T 2207/10028; G06T 17/005; H04N 19/597; H04N 19/34
See application file for complete search history.

(56) References Cited

U.S. PATENT DOCUMENTS 6,353,686 B1 3/2002 Daly et al.

FOREIGN PATENT DOCUMENTS

WO 2006/087319 A2 8/2006

OTHER PUBLICATIONS

Chai et al., "Depth map compression for real-time view-based rendering", Elsevier Science Direct, Pattern Recognition Letters 25, 2004, pp. 755-766.*
(Continued)

Primary Examiner — Brian P Werner
(74) Attorney, Agent, or Firm — Michael Best & Friedrich LLP

(57) ABSTRACT

The invention describes a method for representing geometry information to utilize for scalable coding of piecewise smooth spatial data sets. The method may also be applicable to vector data such as motion, where this data tends to exhibit piecewise smooth characteristics. The hierarchical geometry representation detailed in this invention is spatially scalable and amenable to embedded quantization and coding techniques. These features enable the geometry representation to be incorporated into highly scalable image coding schemes to attain efficient compression and output bit-streams with embedded resolution and quality scalability. Central elements of the invention are: the hierarchical representation of geometry information which describe points of discontinuity in the input data set; a rate-distortion driven estimation process to construct the geometry representation; a process to prioritize the geometry information in accordance to its influence on compression performance; and methods for efficient coding of the geometry information that facilitates resolution and quality scalability.

20 Claims, 7 Drawing Sheets

(51) Int. Cl.
*G06T 9/00* (2006.01)
*H04N 19/167* (2014.01)
*H04N 19/60* (2014.01)
*H04N 19/597* (2014.01)

(56) References Cited

OTHER PUBLICATIONS

PCT/AU2013/000359 International Search Report dated May 30, 2013 (3 pages).

* cited by examiner

METHOD AND APPARATUS FOR CODING OF SPATIAL DATA

FIELD OF INVENTION

The present invention relates to a method and apparatus for coding spatial data, and, particularly, but not exclusively, to a method and apparatus for facilitating image and/or video data coding, and, more particularly, but not exclusively, to method and apparatus for compression and decompression of data for generating images or videos.

BACKGROUND OF THE INVENTION

Piecewise smooth spatial data sets, such as images that represent depth or elevation data, arise in a variety of applications where compression is required. Typical image compression schemes rely on transforms that exploit the spatial correlation among samples in a neighborhood. While these transforms are able to exploit spatial redundancy in smooth regions, they perform poorly at the vicinity of discontinuities. In certain applications the treatment of discontinuities takes on special significance; for example in case of depth maps, the accurate treatment of discontinuities becomes more important when depth information is used to infer 3D geometric structure. In this instance, even small errors in depth at the vicinity of object edges can produce large errors in imagery that is synthesized using the inferred structure.

For many applications, in addition to compression performance, features such as resolution scalability and embedded coding are highly desirable. JPEG 2000 offers these scalability features and has been found to be beneficial for the interactive communication of terrain elevation data, as well as depth maps for image-based rendering. However as noted earlier, problems are encountered in the vicinity of discontinuities in the depth map.

Considering the significance of object boundaries to depth data, previous work has focused on incorporating in some way object geometry into the compression scheme. The motivation being that geometry information can be used to appropriately adapt the local basis function that is employed for transformed based image coding. Significant performance improvements can be gained by ensuring that the basis functions do not cross sharp object boundaries.

Prior work has explored the option of first segmenting objects from the depth map and then compressing the smooth regions within each segment while separately describing the object boundaries using various methods. Unfortunately segmentation is not a well-defined operation and the proposed boundary description schemes do not provide a scalable and embedded representation of object boundaries. In general, boundaries of segmented objects are conveyed by first assigning labels to each sample location in accordance with the segmented region to which it belongs; these labels are then coded using schemes that exploit local context (e.g. arithmetic coding). Such an approach does not facilitate scalable decoding and more importantly do not allow for embedded coding—it makes no sense to apply embedded quantization and coding schemes to labels. Another important limitation of segmentation based approaches is that segmentation is often performed as a pre-processing step, prior to coding and therefore it is difficult to subject segmentation decisions to rate-distortion considerations.

Alternative schemes for depth map coding that avoid the need for object segmentation have also been pursued. In one example, discontinuities in the depth map are described using a quad-tree representation where leaf nodes of the tree are allowed to model discontinuity boundaries. This allows for a piecewise description of discontinues which can be constructed subject to rate-distortion considerations. In more recent work the initial segmentation step is replaced with an edge detection phase where connected edges are prioritized in accordance to their impact on rate-distortion performance and then coded using a chain coding algorithm. While the above schemes have advantages over purely segmentation based approaches, the issues of resolution scalable decoding and embedded geometry representation are not explored.

At a broader level, prior attempts at incorporating image geometry to spatial transforms include work on directional DWT and bandlets. In both these cases, a block based description of dominant orientation is required. For the case of directional DWT non-overlapping, variable size, blocks describe the dominant orientation in the image domain while for the case of bandlets block based descriptions are used to convey dominant orientation of 2D DWT coefficients. Block based description of geometry is not optimal at object boundaries, especially when the boundary contour is irregular or far from a simple linear representation. DWT and bandlets are designed to be responsive only to the dominant or average orientation of an object discontinuity within a given region.

SUMMARY OF THE INVENTION

In accordance with a first aspect, the present invention provides a method for encoding spatial data sets, comprising a hierarchically organized set of breakpoints that identify discontinuities that may exist on the arcs formed between points on a hierarchical grid, the step of performing a breakpoint dependent transformation of the spatial data samples, the step of scalable encoding of the transformed spatial data samples, the step of partitioning the breakpoints into one subset known herein as vertex breakpoints and another subset of non-vertex breakpoints, the step of scalable encoding of the vertex breakpoints, such that their locations are successively refined by the appearance of progressively more bits from an embedded bit-stream, and the step of inferring the locations of the non-vertex breakpoints from vertex breakpoints in coarser levels of the hierarchy or the same level of the hierarchy.

In an embodiment, vertex breakpoints are assigned non-zero numerical values, herein known as vertex values, that identify the location of the vertex within its arc, and arcs that contain no vertex breakpoint are assigned a vertex value of zero, wherein the vertex values are subjected to an embedded bit-plane coding procedure, such that successive bit-planes of the representation provide successively more accurate information about the location of vertex breakpoints.

In an embodiment, the vertex values are integers, with a sign-magnitude representation, where the most significant non-zero magnitude bit identifies the presence of a vertex breakpoint, the sign bit identifies whether the vertex breakpoint occurs in a first or a second half of the arc's line segment, and each successively less significant bit of the magnitude representation, after the first non-zero magnitude bit, refines the location of the breakpoint by a factor of two.

In an embodiment, the hierarchical grid is organized into levels, such that the grid points in each level correspond to the sample locations in the spatial data set whose horizontal and vertical coordinates are both divisible by a whole number known herein as the level divisor.

In an embodiment, the hierarchical grid has a dyadic structure, in which the finest level of the hierarchy has a level divisor of one, the second finest level of the hierarchy has a level divisor of two, and so forth, each successive level having a level divisor that is twice as large as that of the next finer level.

In an embodiment, the arcs formed in each level consist of non-root arcs and root arcs, where the non-root arcs are formed between end grid-points that are two grid points apart and have coordinates that are both divisible by twice the level divisor, while the root-arcs are formed between end grid-points that are two grid points apart with one coordinate divisible by twice the level divisor, but not the other coordinate. This means that the line segments that connect the end grid points of both root arcs and non-root arcs have horizontal and vertical orientations on the grid; moreover root arcs appear in intersecting pairs, such that the horizontal and vertical root arcs in each intersecting pair have their line segments bisected by a grid point whose coordinates are both odd multiples of the level divisor.

In an embodiment, each non-root arc that has no vertex breakpoint of its own is assigned an inferred non-vertex breakpoint at the same location as a breakpoint on the arc from the next coarser level of the hierarchy whose line segment contains that of the non-root arc, herein known as the non-root arc's parent arc, except where said parent arc does not exist or has no breakpoint.

In an embodiment, non-vertex breakpoints are inferred on one or both of the root arcs in an intersecting pair, based on the occurrence and locations of breakpoints within the four adjoining non-root arcs in the same level of the hierarchy.

In an embodiment, breakpoints are inferred only if the four adjoining non-root arcs contain a total of two breakpoints, candidate breakpoints are located at the intersections, if any, between each of the root arc line segments and the line segment that connects the two adjoining non-root arc breakpoints, and these candidate breakpoints are assigned to the root arcs as non-vertex inferred breakpoints, so long as neither of the root arcs that would be assigned a candidate breakpoint has its own vertex breakpoint.

In an embodiment, non-vertex breakpoints are not inferred on the root arcs unless the two breakpoints on the four adjoining non-root arcs are themselves non-vertex breakpoints.

In an embodiment, the non-root arcs for each level of the hierarchy are arranged in a raster scan fashion, such that the associated vertex values form a two dimensional data array, known herein as the non-root arc-band for the level, and the root arcs for each level of the hierarchy are similarly arranged such that the associated vertex values form a two dimensional data array, known herein as the root arc-band of the level.

In an embodiment, the non-root and root arc-bands of each level are partitioned into rectangular regions, known herein as arc-band code-blocks, and each arc-band code-block of an arc-band is independently subjected to an embedded bit-plane coding procedure.

In an embodiment, the bit-plane coding procedure consists of a first step that identifies and encodes the index of the most significant non-zero magnitude bit-plane and the index of the least significant coded bit-plane in the arc-band code-block, followed by a second step that passes through the vertex values in the arc-band code-block once for each magnitude bit-plane, from the most to the least significant, using a context adaptive arithmetic coder to encode the values of the magnitude bits, as well as the value of the sign bit if and when the first non-zero magnitude bit of a vertex value is encountered.

In an embodiment, the contexts used by the context adaptive arithmetic coder are formed from the values of the previously encoded bits for the vertex value being coded and those of its spatial neighbours that are found in the same arc-band code-block.

In an embodiment, the contexts used by the context adaptive arithmetic coder within a given bit-plane of an arc-band code-block are formed as in claim 15, but augmented with the values of bits coded in the more significant bit-planes for neighbouring arcs from the next coarser level of the hierarchy.

In an embodiment, the most significant non-zero bit position for each non-zero vertex value is set in accordance with the priority of the corresponding vertex breakpoint.

In an embodiment, the breakpoint dependent transform starts from the finest level of the hierarchy, in which the original spatial data set is used to initialize input samples for each grid point, and progresses to the coarsest level of the hierarchy, performing the following steps for each level:
  (a) the input values at each grid point are transformed into a set of output values at each grid point, using a breakpoint dependent transformation procedure;
  (b) the output values for those grid points whose coordinates are both even multiples of the level divisor are transferred to the corresponding grid points in the next coarser level of the hierarchy, if any, as input values for that level; and
  (c) the remaining output values for the level are interpreted as subband samples.

In an embodiment, the input values for a level of the hierarchy are transformed into output values through a sequence of prediction steps, where in each prediction step, one subset of the input values is predicted from another subset of the input values, in a manner that depends upon the presence or absence of breakpoints, and the predicted input values are replaced by prediction residuals.

In an embodiment, the grid points of a level are partitioned into cosets and the input values at the grid points belonging to each coset are progressively transformed into output values for the grid points of each coset through a sequence of prediction and update lifting steps, where each lifting step modifies the values within one coset by the addition of a linear combination of values from the other cosets and said linear combination depends upon the presence or absence of breakpoints.

In an embodiment, three cosets are employed, the first consisting of those grid points whose coordinates are both even multiples of the level divisor, the second consisting of those grid points for which one coordinate is an odd multiple of the level divisor and the other coordinate is an even multiple of the level divisor, and the third consisting of those grid points for which both coordinates are odd multiples of the level divisor, where a first lifting step serves to predict the second coset from the first, a second lifting step serves to update the first coset based on the prediction residuals formed in the second coset by the first lifting step, a third lifting step serves to predict the third coset from the first and second cosets, a final lifting step serves to update the first and second cosets based on the prediction residuals formed in the third coset by the third lifting step, and all lifting steps are dependent on the presence or absence of breakpoints.

In an embodiment, update steps have no effect on the grid points of a coset whose neighbouring arcs contain breakpoints.

In an embodiment, the subband samples from each level of the hierarchy are arranged into two dimensional data arrays, four for the coarsest level of the hierarchy, and three for the other levels, each rectangular array being partitioned into rectangular blocks known as subband code-blocks, where each subband code-block is independently subjected to an embedded bit-plane coding procedure.

In an embodiment, the embedded bit-plane coding procedure used for each subband code-block is the same as that used by the JPEG2000 image compression standard.

In an embodiment, the bit-stream segments produced by successive coding passes of the embedded bit-plane coding procedure for each arc-band code-block are grouped into a succession of arc-band quality layers.

In an embodiment, the assignment of bit-stream segments to arcband quality layers is performed in such a way as to approximately minimize a lagrangian rate-distortion objective in which the lagrangian parameters are monotonically decreasing from the first to the last quality layer, and the distortion for a quality layer corresponds to the expected squared error distortion of the reconstructed spatial data set when all subsequent arc-band quality layers are unavailable during decoding.

In an embodiment, the bit-stream segments produced by successive coding passes of the embedded bit-plane coding procedure for each subband codeblock are grouped into a succession of quality layers.

In an embodiment, the assignment of bit-stream segments to subband quality layers is performed in such a way as to approximately minimize a lagrangian rate-distortion objective in which the lagrangian parameters are monotonically decreasing from the first to the last quality layer, and the distortion for a quality layer corresponds to the expected squared error distortion of the reconstructed spatial data set when all subsequent subband quality layers are unavailable during decoding.

In an embodiment, the lagrangian parameters used to determine arc-band quality layers are identical to the lagrangian parameters used to determine subband quality layers.

In an embodiment, the spatial data set comprises disparity data, elevation data and/or horizontal and vertical components from a motion field. The spatial data set can defined by a depth map.

In accordance with the second aspect the present invention provides a method for determining a hierarchically organized set of breakpoints, so as to minimize a lagrangian rate-distortion objective for the encoding of spatial data sets, where in an encoding procedure:
  (a) the breakpoints identify discontinuities that may exist on the arcs formed between points on a hierarchical grid;
  (b) the breakpoints affect the behavior of a transformation that is applied to the spatial data samples and the transformed values are subsequently encoded;
  (c) the breakpoints are partitioned into one subset known herein as vertex breakpoints and another subset of non-vertex breakpoints;
  (d) the locations of the vertex breakpoints are encoded; and
  (e) the non-vertex breakpoints are inferred from vertex breakpoints in coarser levels of the hierarchy or the same level of the hierarchy, wherein the method comprises the steps of:
    (a) determining a set of breakpoints that minimize a lagrangian rate-distortion objective for coding spatial data sets at the finest level of the hierarchy, marking these as vertex breakpoints unless determined otherwise by subsequent steps;
    (b) determining a set of candidate breakpoints at the next coarser level of the hierarchy, such that these candidate breakpoints minimize an energy objective, related to the magnitude of the transformed values that are to be encoded;
    (c) determining a subset of the candidate breakpoints that minimize a lagrangian rate-distortion objective when considered as vertex breakpoints, considering the possibility of discarding vertex breakpoints that were determined in previous steps corresponding to finer levels, and also considering the non-vertex breakpoints that are induced by vertex breakpoints in the current level;
    (d) performing the above step in a manner where the lagrangian rate-distortion is evaluated and optimized only within a first set of spatial regions within a given level of the hierarchy, after which the vertex breakpoints found for those selected spatial regions are fixed and the optimization is continued within a second set of spatial regions;
    (e) repeating steps b to d for each successively coarser level of the hierarchy.

In an embodiment, the first set of spatial regions consists of square regions that resemble the white squares on a chess boards, while the second set of spatial regions consists of square regions that resemble the black squares on a chess board.

In an embodiment, each square region contains two interior arcs and four boundary arcs from the level of the hierarchy that is being considered, where the lagrangian rate-distortion objective is optimized independently for each square region belonging to the first set of spatial regions.

In an embodiment, the lagrangian rate-distortion objective is optimized independently for each square region belonging to the second set of spatial regions, having fixed the boundary arc breakpoints found while optimizing the first set of square regions, so that only the breakpoints for interior arcs are optimized for this second set of regions.

In accordance with the third aspect the present invention provides a method for decoding spatial data sets from an encoded representation that involves a hierarchically organized set of breakpoints that identify discontinuities that may exist on the arcs formed between points on a hierarchical grid, the method comprising the step of decoding the locations of a subset of the breakpoints, herein known as vertex breakpoints, the step of inferring the remaining breakpoints, herein known as non-vertex breakpoints, based on the locations of vertex breakpoints in coarser levels of the hierarchy or the same level of the hierarchy, the step of decoding transformed spatial data values, and the step of performing breakpoint dependent inverse transformation of the transformed spatial data values, so as to recover spatial data sample values.

In an embodiment, vertex breakpoints are assigned non-zero numerical values, herein known as vertex values, that identify the location of the vertex within its arc, and arcs that contain no vertex breakpoint are assigned a vertex value of zero.

In an embodiment, the vertex values are decoded using an embedded bit-plane decoding procedure.

In an embodiment, the vertex values are integers, with a sign-magnitude representation, where the most significant non-zero magnitude bit identifies the presence of a vertex breakpoint, the sign bit identifies whether the vertex breakpoint occurs in a first or a second half of the arc's line segment, and each successively less significant bit of the magnitude representation, after the first non-zero magnitude bit, refines the location of the breakpoint by a factor of two.

In an embodiment, the hierarchical grid is organized into levels, such that the grid points in each level correspond to the sample locations in the spatial data set whose horizontal and vertical coordinates are both divisible by a whole number known herein as the level divisor.

In an embodiment, the hierarchical grid has a dyadic structure, in which the finest level of the hierarchy has a level divisor of one, the second finest level of the hierarchy has a level divisor of two, and so forth, each successive level having a level divisor that is twice as large as that of the next finer level.

In an embodiment, the arcs formed in each level consist of non-root arcs and root arcs, where the non-root arcs are formed between end grid-points that are two grid points apart and have coordinates that are both divisible by twice the level divisor, while the root-arcs are formed between end grid-points that are two grid points apart with one coordinate divisible by twice the level divisor, but not the other coordinate. This means that the line segments that connect the end grid points of both root arcs and non-root arcs have horizontal and vertical orientations on the grid; moreover root arcs appear in intersecting pairs, such that the horizontal and vertical root arcs in each intersecting pair have their line segments bisected by a grid point whose coordinates are both odd multiples of the level divisor.

In an embodiment, each nonzero decoded vertex value, the number of actually decoded magnitude bit-planes, starting from the most significant non-zero magnitude bit-plane, is recorded, this number of decoded magnitude bit-planes being known herein as the breakpoint's precision value.

In an embodiment, each non-root arc that has no vertex breakpoint of its own is assigned an inferred non-vertex breakpoint at the same location as a breakpoint on the arc from the next coarser level of the hierarchy whose line segment contains that of the non-root arc, herein identified as the non-root arc's parent arc, except where said parent arc does not exist, has no breakpoint or has a precision value of one; moreover, said inferred non-vertex breakpoint is assigned a breakpoint precision value equal to one less than the parent breakpoint's precision value.

In an embodiment, non-vertex breakpoints and break point precision values are inferred on one or both of the root arcs in an intersecting pair, based on the occurrence, locations and precision values of breakpoints within the four adjoining non-root arcs in the same level of the hierarchy.

In an embodiment, breakpoints are inferred only if the four adjoining non-root arcs contain a total of two breakpoints, candidate breakpoints are located at the intersections, if any, between each of the root arc line segments and the line segment that connects the two adjoining non-root arc breakpoints, and these candidate breakpoints are assigned to the root arcs as non-vertex inferred breakpoints, so long as neither of the root arcs that would be assigned a candidate breakpoint has its own vertex breakpoint.

In an embodiment, the inferred root arc breakpoints are assigned breakpoint precision values that are equal to the minimum of the precision values associated with the two breakpoints on the four adjoining non-root arcs.

In an embodiment, non-vertex breakpoints are not inferred on the root arcs unless the two breakpoints on the four adjoining non-root arcs are themselves non-vertex breakpoints.

In an embodiment, the non-root arcs for each level of the hierarchy are arranged in a raster scan fashion, such that the associated vertex values form a two dimensional data array, known herein as the non-root arc-band for the level, and the root arcs for each level of the hierarchy are similarly arranged such that the associated vertex values form a two dimensional data array, known herein as the root arc-band of the level.

In an embodiment, the non-root and root arc-bands of each level are partitioned into rectangular regions, known herein as arc-band code-blocks, and each arc-band code-block of an arc-band is independently decoded using an embedded bit-plane decoding procedure.

In an embodiment, the bit-plane decoding procedure consists of a first step that decodes the indices of the most significant and least significant coded bit-planes in the arc-band code-block, followed by a second step that passes through the vertex values in the arc-band code-block once for each magnitude bit-plane, from the most to the least significant, using a context adaptive arithmetic decoder to decode the values of the magnitude bits, as well as the value of the sign bit if and when the first non-zero magnitude bit of a vertex value is encountered.

In an embodiment, the contexts used by the context adaptive arithmetic decoder are formed from the values of the previously decoded bits for the vertex value being coded and those of its spatial neighbours that are found in the same arc-band code-block.

In an embodiment, the contexts used by the context adaptive arithmetic decoder within a given bit-plane of an arc-band code-block are formed as in claim 54, but augmented with the values of bits decoded for the more significant bit-planes of neighbouring arcs from the next coarser level of the hierarchy.

In an embodiment, the breakpoint dependent inverse transform starts from the coarsest level of the hierarchy and progresses to the finest level of the hierarchy in which output values at each grid point correspond to the decoded spatial data set, performing the following steps for each level:

(a) input values for those grid points whose coordinates are both even multiples of the level divisor are obtained from the output values produced at the corresponding grid points in the next coarser level of the hierarchy, if any;

(b) input values for the remaining grid points in the level are obtained from the decoded transformed spatial data sample values; and (c) the input values at each grid point are transformed into a set of output values at each grid point, using a breakpoint dependent inverse transformation procedure.

In an embodiment, the input values for a level of the hierarchy are transformed into output values by inverting a sequence of prediction steps, where in each inverted prediction step, one subset of the input values is added to a set of predicted values that is formed from another subset of the input values, in a manner that depends upon the presence or absence of breakpoints.

In an embodiment, the grid points of a level are partitioned into cosets and the input values at the grid points belonging to each coset are progressively transformed into output values for the grid points of each coset through a sequence of update and prediction lifting steps, where each lifting step modifies the values within one coset by the addition of a linear combination of values from the other cosets and said linear combination depends upon the presence or absence of breakpoints.

In an embodiment, three cosets are employed, the first consisting of those grid points whose coordinates are both odd multiples of the level divisor, the second consisting of those grid points for which one coordinate is an odd multiple of the level divisor and the other coordinate is an even multiple of the level divisor, and the third consisting of those grid points for which both coordinates are even multiples of the level divisor, where a first lifting step serves to update the first and second cosets based on the sample values in the third coset, a second lifting step serves to add predicted values from the updated first and second cosets to the third coset, a third lifting step serves to update the first coset based on updated values found in the second coset, a final lifting step serves to add predicted values from the updated first coset to the updated second coset, and all lifting steps are dependent on the presence or absence of breakpoints.

In an embodiment, update steps have no effect on the grid points of a coset whose neighbouring arcs contain breakpoints.

In an embodiment, the subband samples from each level of the hierarchy are arranged into two dimensional data arrays, four for the coarsest level of the hierarchy, and three for the other levels, each rectangular array being partitioned into rectangular blocks known as subband code-blocks, where each subband code-block is independently decoded using an embedded bit-plane decoding procedure.

In an embodiment, the embedded bit-plane decoding procedure used for each subband code-block is the same as that used by the JPEG2000 image compression standard.

In an embodiment, the bit-stream segments required by successive decoding passes of the embedded bit-plane decoding procedure for each arc-band code-block are extracted from a succession of arc-band quality layers.

In an embodiment, the bit-stream segments required by successive decoding passes of the embedded bit-plane decoding procedure for each subband code-block are extracted from a succession of quality layers.

In an embodiment, the spatial data set comprises disparity data, elevation data and/or horizontal and vertical components from a motion field. The spatial data set can defined by a depth map Embodiments of the present invention address several challenges that need to be satisfied for geometry information to be truly integrated into a scalable coding scheme for piecewise smooth spatial data sets. Firstly decisions regarding the description of boundary geometry in the spatial data set need to be subject to rate-distortion considerations. Secondly the geometry information needs to be represented in a scalable manner so as to facilitate resolution and quality scalability. A third challenge is to encode the geometry data efficiently and in an embedded manner such that the output bit-stream will represent an embedded representation of the various resolution and quality levels. At least an embodiment of the present invention addresses all the three challenges making it especially suitable for a range of applications where the provision of compressed geometry data needs to be responsive to client capabilities, changes in user preferences and variations in network conditions; examples include remote browsing and interactive retrieval of geometry information over channels with varying bandwidth capacity.

Embodiments of the present invention relate to the efficient compression of piecewise smooth spatial data sets of which depth maps and elevation data represent prime examples. Embodiments of the invention are concerned with the scalable representation of geometry information, which describes points of discontinuity in the piecewise smooth spatial data set. This geometry information can be used to adapt the basic functions of transform based spatial compression schemes so as to achieve efficient compression; the scalability attribute of the geometry representation facilitates scalable decoding of the spatial data set. In particular, embodiments of the invention comprise:

1) methods for efficiently and scalably representing geometry information which describe points of discontinuity in the spatial data set;
2) methods for utilizing the geometry information to better exploit spatial correlation for efficient compression;
3) methods for prioritizing the geometry information in accordance to its influence on compression performance;
4) methods for efficient coding of the geometry information that facilitates resolution and quality scalable decoding; and
5) methods for estimating the geometry parameters with respect to a suitable fidelity criteria.

It is envisaged that embodiments of the invention may be used in conjunction with spatial decorrelating transforms, quantization and symbol encoding techniques to create a complete coding system. For piecewise smooth spatial data sets, coding schemes typically exploit the spatial correlation that is prevalent among samples of the data set to achieve compression; while smooth regions display high levels of correlation, regions with discontinuity or sharp transitions correspond to low spatial correlation and hence are expensive to code. Embodiments of the invention lend themselves to efficiently describe geometry information which can be used to adapt the spatial decorrelating transform to improve compression efficiency in vicinity of discontinuities. Embodiments of the present invention can be incorporated into the popular JPEG 2000 image coding scheme to adapt the operation of the Discrete Wavelet Transform (DWT) in accordance with the corresponding geometry information.

A feature of an embodiment of the invention is that it provides a scalable description of the geometry information. Scalability in this context refers to both resolution and quality scalability such that the encoded bit-stream contains an embedded collection of layers that can be decoded successively from coarse to fine spatial resolution or from low to high quality levels for a given resolution. Such a scalable representation is useful in situations where the full bit-stream is not available to the decoder. Since embodiments of the present invention lend themselves to be incorporated with a transform based image coding scheme, such as JPEG 2000, two scalable output bit-streams can be produced; one for the geometry information created in accordance with this invention and the other for the transformed sample data formed in accordance with the image coding scheme (e.g. JPEG 2000). Having two scalable bit-streams means that they can be independently and incrementally sequenced based on particular performance considerations.

In accordance with the fourth aspect, the present invention provides a method for facilitating processing of spatial data, comprising the steps of determining breakpoints in the data, and utilising the breakpoints to process the spatial data.

In an embodiment the breakpoints are discontinuity which exists along certain "arcs" within the data. In an embodiment the breakpoints can be judicially placed on the arcs in a manner that directly optimizes the performance of a compression process, usually assessed in terms of the minimization of Lagrangian rate-distortion objective $J=D+\lambda*L$ where D represents distortion in the decoded spatial domain, L the coded length and $\lambda$ is a Lagrangian multiplier.

In an embodiment the breakpoints are utilized to code the spatial data.

In an embodiment, breakpoints are determined within resolutions of a multi resolution hierarchy of the data.

In an embodiment, the method comprises the further step of inferring breakpoints from other breakpoints.

In an embodiment, the method comprising the steps of treating the breakpoint locations as numerical quantities on a hierarchical grid, to facilitate scalable encoding.

In an embodiment, the method comprises associating priority values for breakpoints to enable decoding to commence for higher priority breakpoints prior to lower priority breakpoints.

In accordance with a fifth aspect, the present invention provides an apparatus for implementing the methods of any one of the first to fourth aspects of the present invention.

In accordance with the sixth aspect, the present invention provides a computer programme comprising instructions for controlling a computer to implement a method in accordance with any one of the first to fourth aspects of the invention.

In accordance with the seventh aspect, the present invention provides a computer readable medium providing a computer programme in accordance with the sixth aspect of the invention.

In accordance with an eighth aspect, the present invention provides a data signal comprising a computer programme in accordance with the sixth aspect of the invention.

In accordance with an ninth aspect, the present invention provides an apparatus for encoding spatial data sets, comprising a hierarchically organized set of breakpoints that identify discontinuities that may exist on the arcs formed between points on a hierarchical grid, the apparatus comprising an arrangement for performing a breakpoint dependent transformation of the spatial data samples, an arrangement for scalable encoding of the transformed spatial data samples, an arrangement for partitioning the breakpoints into one subset known herein as vertex breakpoints and another subset of non-vertex breakpoints, the step of scalable encoding of the vertex breakpoints, such that their locations are successively refined by the appearance of progressively more bits from an embedded bit-stream, and an arrangement for inferring the locations of the non-vertex breakpoints from vertex breakpoints in coarser levels of the hierarchy or the same level of the hierarchy.

In accordance with an tenth aspect, the present invention provides an apparatus for determining a hierarchically organized set of breakpoints, so as to minimize a lagrangian rate-distortion objective for the encoding of spatial data sets, where in an encoding procedure:
(a) the breakpoints identify discontinuities that may exist on the arcs formed between points on a hierarchical grid;
(b) the breakpoints affect the behavior of a transformation that is applied to the spatial data samples and the transformed values are subsequently encoded;
(c) the breakpoints are partitioned into one subset known herein as vertex breakpoints and another subset of non-vertex breakpoints;
(d) the locations of the vertex breakpoints are encoded; and
(e) the non-vertex breakpoints are inferred from vertex breakpoints in coarser levels of the hierarchy or the same level of the hierarchy, wherein the apparatus comprising an arrangement for:
(a) determining a set of breakpoints that minimize a lagrangian rate-distortion objective for coding spatial data sets at the finest level of the hierarchy, marking these as vertex breakpoints unless determined otherwise by subsequent steps;
(b) determining a set of candidate breakpoints at the next coarser level of the hierarchy, such that these candidate breakpoints minimize an energy objective, related to the magnitude of the transformed values that are to be encoded;
(c) determining a subset of the candidate breakpoints that minimize a lagrangian rate-distortion objective when considered as vertex breakpoints, considering the possibility of discarding vertex breakpoints that were determined in previous steps corresponding to finer levels, and also considering the non-vertex breakpoints that are induced by vertex breakpoints in the current level;
(d) wherein the arrangement is arranged to perform the above step in a manner where the lagrangian rate-distortion is evaluated and optimized only within a first set of spatial regions within a given level of the hierarchy, after which the vertex breakpoints found for those selected spatial regions are fixed and the optimization is continued within a second set of spatial regions.

In accordance with an eleventh aspect, the present invention provides an apparatus for decoding spatial data sets from an encoded representation that involves a hierarchically organized set of breakpoints that identify discontinuities that may exist on the arcs formed between points on a hierarchical grid, the apparatus comprising an arrangement for decoding the locations of a subset of the breakpoints, herein known as vertex breakpoints, an arrangement for inferring the remaining breakpoints, herein known as non-vertex breakpoints, based on the locations of vertex breakpoints in coarser levels of the hierarchy or the same level of the hierarchy, an arrangement for decoding transformed spatial data values, and an arrangement for performing breakpoint dependent inverse transformation of the transformed spatial data values, so as to recover spatial data sample values.

In accordance with a twelfth aspect, the present invention provides a method for encoding data sets, comprising a hierarchically organized set of breakpoints that identify discontinuities that may exist on the arcs formed between points on a hierarchical grid, the steps of performing a breakpoint dependent transformation of the data samples, the step of scalable encoding of the transformed data samples, the step of partitioning the breakpoints into one subset known herein as vertex breakpoints and another subset of non-vertex breakpoints, the step of scalable encoding of the vertex breakpoints, such that their locations are successively refined by the appearance of progressively more bits from an embedded bit-stream, and the step of inferring the locations of the non-vertex breakpoints from vertex breakpoints in coarser levels of the hierarchy or the same level of the hierarchy.

In accordance with a thirteenth aspect, the present invention provides a method for determining a hierarchically organized set of breakpoints, so as to minimize a lagrangian rate-distortion objective for the encoding of data sets, where in an encoding procedure:
(a) the breakpoints identify discontinuities that may exist on the arcs formed between points on a hierarchical grid;
(b) the breakpoints affect the behaviour of a transformation that is applied to the data samples and the transformed values are subsequently encoded;

(c) the breakpoints are partitioned into one subset known herein as vertex breakpoints and another subset of non-vertex breakpoints;
(d) the locations of the vertex breakpoints are encoded; and
(e) the non-vertex breakpoints are inferred from vertex breakpoints in coarser levels of the hierarchy or the same level of the hierarchy, wherein the method comprises the steps of:
(a) determining a set of breakpoints that minimize a lagrangian rate-distortion objective for coding data sets at the finest level of the hierarchy, marking these as vertex breakpoints unless determined otherwise by subsequent steps;
(b) determining a set of candidate breakpoints at the next coarser level of the hierarchy, such that these candidate breakpoints minimize an energy objective, related to the magnitude of the transformed values that are to be encoded;
(c) determining a subset of the candidate breakpoints that minimize a lagrangian rate-distortion objective when considered as vertex breakpoints, considering the possibility of discarding vertex breakpoints that were determined in previous steps corresponding to finer levels, and also considering the non-vertex breakpoints that are induced by vertex breakpoints in the current level;
(d) performing the above step in a manner where the lagrangian rate-distortion is evaluated and optimized only within a first set of spatial regions within a given level of the hierarchy, after which the vertex breakpoints found for those selected spatial regions are fixed and the optimization is continued within a second set of spatial regions;
(e) repeating steps b to d for each successively coarser level of the hierarchy.

In accordance with an fourteenth aspect, the present invention provides a method for decoding data sets from an encoded representation that involves a hierarchically organized set of breakpoints that identify discontinuities that may exist on the arcs formed between points on a hierarchical grid, the method comprising the step of decoding the locations of a subset of the breakpoints, herein known as vertex breakpoints, the step of inferring the remaining breakpoints, herein known as non-vertex breakpoints, based on the locations of vertex breakpoints in coarser levels of the hierarchy or the same level of the hierarchy, the step of decoding transformed data values, and the step of performing breakpoint dependent inverse transformation of the transformed data values, so as to recover spatial data sample values.

Embodiments of the invention describe boundary geometry using breakpoints which correspond to points of discontinuity in the input spatial data set. The breakpoints are arranged in a hierarchical manner such that for each spatial resolution the relevant breakpoint can be readily identified. Rules are established such that breakpoints at coarser resolutions can induce breakpoints at finer spatial resolutions; this allows for more compact representation of the breakpoint data while also being beneficial for scalable decoding in the event that information from finer resolutions are discarded. By using a collection of breakpoints to describe boundary geometry, the embodiment avoids the need to identify explicit boundary segments or perform complex parametric modeling of edges. The decision to include a breakpoint into the final hierarchical description can be based purely on rate-distortion considerations and since the decision pertains to a single point, its local impact to compression performance can be readily established. The embodiment applies embedded quantization and coding schemes to breakpoints at each resolution level to create a scalable and embedded output bit-stream. Embodiments of the invention lend themselves to be incorporated with the highly scalable JPEG 2000 coding scheme such that at the vicinity of breakpoints, the basis function of the DWT can be appropriately modified to ensure improved compression performance. Incorporating the invention with a JPEG 2000 encoder allows for a JPEG 2000 compliant output bit-stream for the spatial samples and a separate embedded bit-stream for the breakpoint information. These two bit-streams can be independently and incrementally sequenced to achieve overall rate-distortion optimality; this is a feature that is missing from prior approaches.

Embodiments of the invention have application in interactive retrieval and streaming of compressed representations of piecewise smooth spatial data sets. Elements of the invention include: hierarchical representation of geometry information which describe points of discontinuity in the input data sets; rate distortion driven estimation process to construct the geometry representations; a process to prioritize the geometry information in accordance to its influence on compression performance; and methods for efficient coding of the geometry information to facilitate resolution and quality scalability.

Examples of piecewise smooth spatial data sets include depth maps and elevation data. The invention is not limited to just these data types, however. Other embodiments may also be applicable to vector data such as motion, particularly where this data tends to exhibit piecewise smooth characteristics. For example, embodiments may be utilized with motion maps. Instead of spatial data, vector data can also be processed by embodiments of the invention, therefore. Other types of data may also be processed using embodiments of the present invention.

BRIEF DESCRIPTION OF THE DRAWING

Features and advantages of the present invention will become apparent from the following description of embodiments thereof, by way of example only, with reference to the accompanying drawings, in which.

DETAILED DESCRIPTION OF PREFERRED EMBODIMENTS OF THE INVENTION

In the following discussions, key concepts and terminology relevant to embodiments of the invention are first introduced. A more detailed description of the methods and techniques of embodiments are then provided in later subsections.

Figures 1A, 1B:
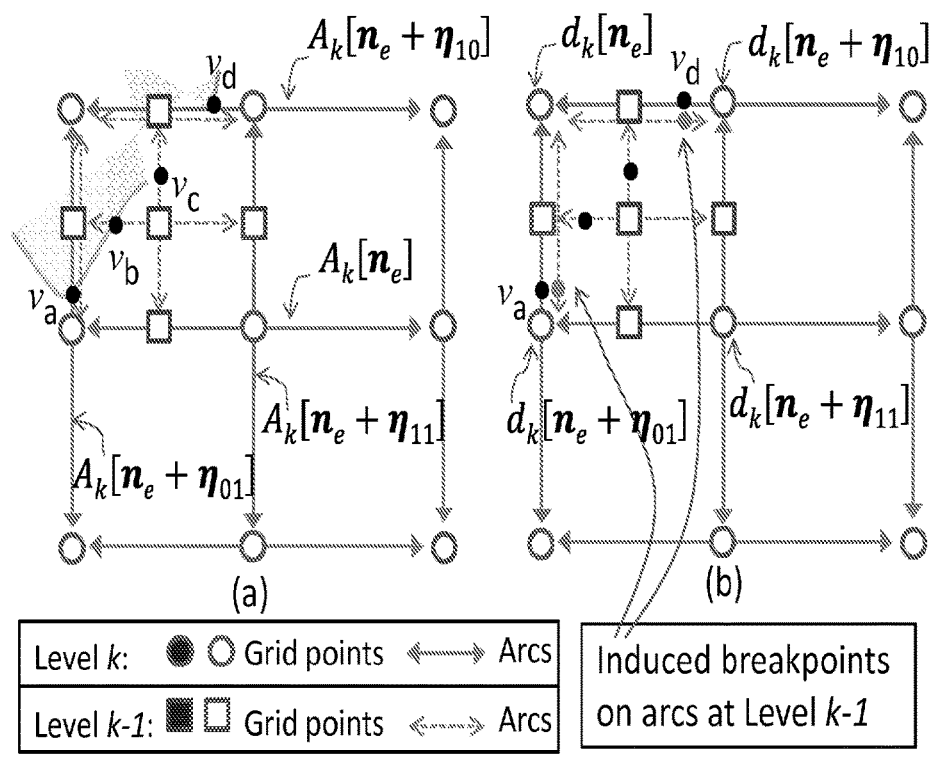
FIG. 1(a) is a diagram showing a proposed scheme of an embodiment: object boundaries conveyed by vertices which communicate points of discontinuity along grid arcs.
FIG. 1(b) shows an embodiment of a proposed scheme, examples of breakpoints induced at k−1 from vertices at level k.

An embodiment of invention adopts a pyramid structure to describe the spatial samples and corresponding boundary geometry information. In an embodiment of the invention, the pyramid structure corresponds to a hierarchical arrangement of dyadically spaced grids. At each resolution, sample values are associated with the regularly spaced points on the grid. The horizontal and vertical lines which connect grid points together are referred to as arcs—this is shown in FIG. 1(*a*). The embodiment conveys geometry information by using the notion of an arc breakpoint which corresponds to a point of discontinuity on an arc; therefore sample discontinuities at object boundaries are described by using a collection of appropriate arc breakpoints. The embodiment requires only a subset of breakpoints to be explicitly communicated and these are referred to as vertices. Various strategies or rules can be used to induce the remaining breakpoints from vertices. In this embodiment of the invention, breakpoints at a coarser resolution level can recursively induce breakpoints on arcs at finer levels. This inducing rule takes advantage of the hierarchical structure of the breakpoint representation.

FIG. 1 shows the pyramid structure used by the embodiment for the case of two resolution levels. The discontinuity between the two regions shown in FIG. 1(*a*) is communicated by the placement of vertices on specific arcs. In the figure, the discontinuity between two regions is communicated by 4 vertices: $v_a$ and $v_d$ placed on arcs $A_k[n]$ at level k, and $v_b$ and $v_c$ on arcs $A_{k-1}[n]$ at the finer resolution level k−1. Together, these vertices describe 2 breakpoints at level k and 4 breakpoints at level k−1; the two induced breakpoints are shown in FIG. 1(*b*). Further information regarding inducing of breakpoints is detailed in Section 3.1.

As revealed by FIG. 1, the arcs $A_k[n]$ at a given resolution k are in one to one correspondence with the grid points at the same resolution; therefore vertex locations form a type of image pyramid. This enables the embodiment to borrow scalable image compression techniques to represent geometry with two dimensions of scalability, where resolution scalability is associated with the density of arcs on which vertices can be placed, while the precision to which discontinuities are located grows with the number of bits communicated for each vertex. Moreover, the progressive appearance of vertices on arcs and the progressive communication of precision bits for these vertices can be sequenced within a rate-distortion optimization framework.

The vertex pyramid is accompanied by the pyramid structure for the spatial samples. The sample values at the nodes of this grid are transformed by basic functions which are adapted in accordance with any nearby breakpoints. In this embodiment of the invention, the original data set is subject to a breakpoint-adaptive discrete wavelet transform (BPA-DWT) where the breakpoints adapt the DWT so as to avoid the wavelet bases from crossing edges.

FIG. 1 illustrates that at each resolution level k, sample data $d_k[n]$ is provided at the nodes of a rectangular grid having an interval spacing of $2^k \times 2^k$; therefore $d_k[n]$ refers to the spatial sample at location $[2^k n_1, 2^k n_2]$. To simplify our future discussions, we introduce the notation $n_e$ to refer to locations where both the horizontal and vertical indices $(n_1, n_2)$ are even; that is $n_e \in 2Z$. The remaining samples are described in terms of offsets from $n_e$, such that $\eta_{xy}$ represents an offset (x, y); specifically $\eta_{10}=(1,0)$, $\eta_{01}=(0,1)$ and $\eta_{11}=(1,1)$ represent horizontal, vertical and diagonal offsets respectively.

Relationship between Vertices and Breakpoints

A breakpoint describes the location of a break or discontinuity on an arc. A field of breakpoints at a particular resolution level represents all identified breaks that can be used to adapt the transform basis functions applied at that level. In this embodiment of the invention, a breakpoint value equates to the location of a break relative to the centre of an arc and a value of 0 is assumed to mean that there is no break; the resulting breakpoint fields drive the BPA-DWT at each level.

Figure 2:
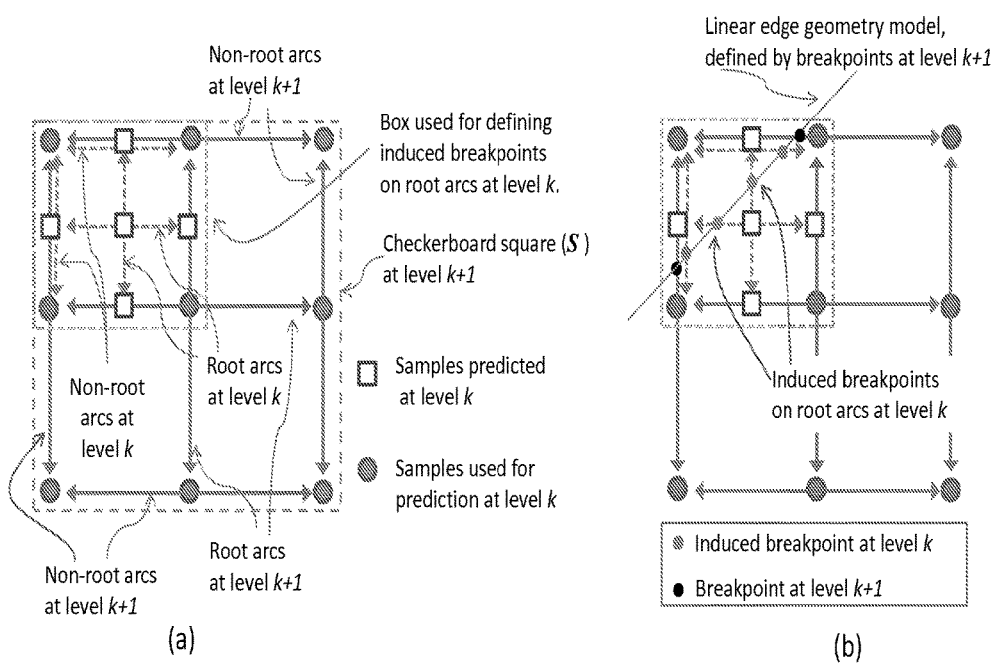
FIG. 2(a) shows hierarchical arrangements of arcs and grid points for two levels.
FIG. 2(b) shows an example of breakpoints at level k+1 inducing breakpoints on opposite level k; induced breakpoints on root areas follow a simple geometry model.

A breakpoint field at level k is induced from explicitly coded vertices. In preferred embodiments of the invention, breakpoints at level k are induced from vertices located at level k or coarser levels. This allows for a more compact representation of the breakpoint field while still ensuring spatial scalability. In this embodiment of the invention, vertices can induce breakpoints in one of two ways; to explain these two cases the notion of root arcs and non-root arcs is required. The term root arcs is used to refer to new arcs that emerge at a given level and hence are not contained within arcs at coarser levels; non-root arcs on the other hand are sub-arcs or refinements of existing arcs at coarser levels. The distinction between root and non-root arcs is illustrated in FIG. 2. To be more specific, $A_k[n_e]$ and $A_k[n_e+\eta_{11}]$ refer to the horizontal and vertical root arcs at level k; while the non-root arcs are referenced as $A_k[n_e+\eta_{10}]$ and $A_k[n_e+\eta_{01}]$ (see FIG. 1). Note that $A_k[n]$ is a root arc if the coordinates $n_1$ and $n_2$ are either both even or both odd—see FIG. 1

A vertex $v_j[n]$ placed on an arc $A_j[n]$ is always a breakpoint for that arc, whose location is determined to the precision with which the vertex is communicated. Depending on their precision, vertices at one level in the hierarchy recursively induce additional breakpoints on arcs at finer resolution levels, except where contradicted by the presence of vertices. A breakpoint on one arc naturally induces a breakpoint on one of its two sub-arcs at the next finer level, except where that sub-arc contains its own vertex. This embodiment of the invention also allows breakpoints to be induced on root arcs at level k based on line segments defined by breakpoints at level k+1; refer to FIG. 2(*b*). To be more specific, in an embodiment, a breakpoint is induced on root arc $A_k[n_e]$ if: a) there is no vertex communicated for $A_k[n_e]$ (i.e., $v_k[n_e]=0$); b) the bounding square surrounding $A_k[n_e]$, contains two breakpoints in level k+1 (either a vertex in level k+1 or a breakpoint induced from coarser levels), whose connecting line segment intersects $A_k[n_e]$; and c) the other root arc $A_k[n_e+\eta_{11}]$ that intersects with $A_k[n_e]$ has no vertex. Similar considerations apply for induced breakpoints on root arc $A_k[n_e+\eta_{11}]$.

The ability to induce breakpoints on root arcs is useful for efficient representation of approximate object boundaries, especially at low bit-rates; it also enables breakpoints at finer resolutions to be predicted in the event that vertices at these resolutions are discarded through truncation of the scalably coded bit-stream. In a progressive dissemination setting, once a non-zero $v_k[n_e]$ (resp. $v_k[n_e+\eta_{11}]$) becomes available (this depends on the availability of sufficient bits at the decoder), any induced breakpoint for $A_k[n_e]$ (resp. $A_k[n_e+\eta_{11}]$) is replaced by this vertex.

A feature of the above embodiment of the invention is that each level k provides at most one breakpoint per arc. This ensures that the adaptive interpolation or transform applied to the input data set samples is always well defined; this is explained further in the following discussions.

Many different sets of rules could potentially be used to govern the inducing of breakpoints from vertices. Features of these rules are that: 1) starting from the available vertices, breakpoints are induced recursively from coarse resolutions to fine; 2) the rules for inducing breakpoints ultimately lead to the determination of at most one breakpoint for each arc; and 3) the presence of vertices at some resolution prevents breakpoints from being induced that would be incompatible, in a geometric sense, with the presence of these vertices.

Breakpoint Adaptive Prediction of Spatial Samples

In a simple embodiment of the invention, the breakpoint adaptive transform can be limited to a purely predictive scheme. This means that the spatial data set at resolution level k is represented as prediction residuals, relative to interpolated sample values formed from the next coarser resolution. Interpolation takes place on the arcs at resolution level k, in a manner that depends upon arc breakpoints. In an embodiment of the invention this predictive scheme is generalized to form an adaptive wavelet transform with the introduction of additional lifting steps. As explained earlier, the term breakpoint-adaptive discrete wavelet transform (BPA-DWT) is used to refer to the transform in this one embodiment of the invention. In the following discussions a simple embodiment of the invention is considered first, wherein the respective prediction residuals are referred to as sub-band data. A method for extending this purely predictive implementation to the preferred BPA-DWT is presented in Section 3.2.2.

Predictive Scheme

At each resolution level k, sample data $d_k[n]$ is provided at the nodes of a rectangular grid having an interval spacing of $2^k \times 2^k$; therefore $d_k[n]$ refers to the spatial sample at location $[2^k n_1, 2^k n_2]$. To encode the spatial data set for level k, the first step is to interpolate the samples $d_{k+1}[n]$ from the immediate coarser level, to form predicted sample values $\check{d}_k[n_e+\eta_{10}]$, $\check{d}_k[n_e+\eta_{01}]$ and $\check{d}_k[n_e+\eta_{11}]$, relative to which only the prediction residuals $x_k[n]=d_k[n]-\check{d}_k[n]$ need be coded. The residuals $x_k[n_e+\eta_{10}]$, $x_k[n_e+\eta_{01}]$ and $x_k[n_e+\eta_{11}]$ can be interpreted as HL, LH and HH sub-band coefficients at level k. When the prediction step is applied recursively to a frame of size $2^K \times 2^K$, each successively finer resolution level k contributes $3 \cdot 2^{2(K-k-1)}$ prediction residuals $x_k[n]$, for a non-redundant representation involving $2^{2K}$ spatial samples. In this hierarchical representation, an effective prediction strategy is essential to keep most residual values close to 0. In embodiments of the invention, prediction residuals are compressed using the fractional bit-plane coding techniques of JPEG 2000's EBCOT algorithm, forming an embedded representation in which most residuals get quantized to zero, except when decoding at very high bit-rates. In fact, the embedded block bit-streams formed in this way can be encapsulated within the existing JPEG 2000 codestream syntax and incrementally disseminated via JPIP.

Figure 3:
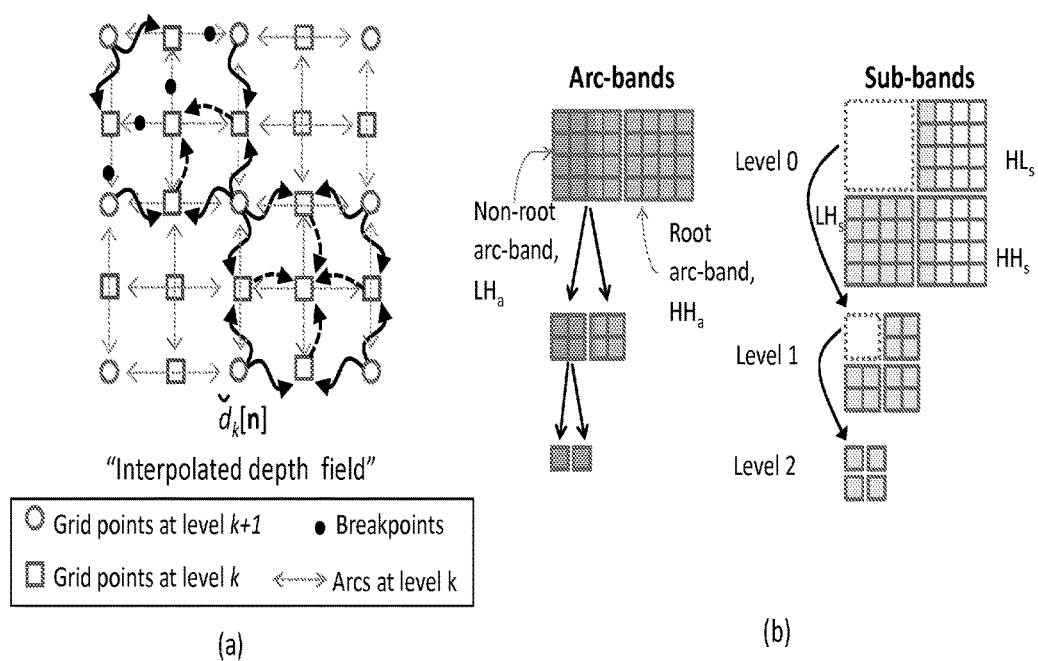
FIG. 3(a) shows a diagram illustrating a breakpoint adapted prediction of depth data at level k. For simplicity and totalations shown only for a subset of locations.
FIG. 3(b) is a diagram showing arc-band and sub-band pyramids.

Various breakpoint-adaptive prediction schemes are possible; one embodiment is the simple scheme illustrated in FIG. 3. For a given level k predictions are calculated for all new sample points appearing at the level—this corresponds to locations with either one or two odd indices. The prediction scheme is carried out in two stages; first a prediction $\check{d}_k[n_e+\eta_{11}]$ is formed for the centre point of the two root arcs by averaging the breakpoint-adaptive predictions obtained by using (i) neighboring horizontal samples and (ii) neighboring vertical samples at level k. The horizontal prediction for the centre point is given by $$h_{root}=P(A_k[n_e], d_k[n_e+\eta_{01}], d_k[n_e+\eta_{21}])$$

where the notation P refers to a breakpoint-adaptive prediction operator and $A_k[n_e]$ refers to the horizontal root arc connecting locations $[2^k 2n_1, 2^k(2n_2+1)]$ and $[2^k(2n_1+2), 2^k(2n_2+1)]$. In a similar way the vertical prediction for the centre point is given by $$v_{root}=P(A_k[n_e+\eta_{11}], d_k[n_e+\eta_{10}], d_k[n_e+\eta_{12}])$$

where $A_k[n_e+\eta_{11}]$ corresponds to the vertical root arc. The final prediction value for the centre point is then calculated as $$\check{d}_k[n_e+\eta_{11}]=\tfrac{1}{2}[h_{root}+v_{root}].$$

The second stage of the prediction scheme considers the remaining horizontal and vertical non-root arcs with sample data from the immediate coarser level k+1 used in the prediction operations. The predictor for the mid point of the horizontal arc is given by $$\check{d}_k[n_e+\eta_{10}]=P(A_k[n_e+\eta_{10}], d_{k+1}[\tfrac{1}{2}n_e], d_{k+1}[\tfrac{1}{2}n_e+\eta_{10}])$$

where $A_k[n_e+\eta_{10}]$ refers to the horizontal non-root arc connecting locations $[2^k 2n_1, 2^k 2n_2]$ and $[2^k(2n_1+2), 2^k 2n_2]$. Similarly the prediction for the vertical non-root arc is specified by $$\check{d}_k[n_e+\eta_{01}]=P(A_k[n_e+\eta_{01}], d_{k+1}[\tfrac{1}{2}n_e], d_{k+1}[\tfrac{1}{2}n_e+\eta_{01}]).$$

In calculating the prediction values for each arc, various breakpoint-adaptive operators P can be employed. One simple strategy is to perform averaging of the two neighboring data samples in the absence of a break-point on the arc, while on occasions where a break-point exists to choose one of the two data samples, depending on the location of the breakpoint on the arc. This corresponds to calculating predictions using liner interpolation for smooth arcs and zero-order-hold for arcs with breakpoints. It should be apparent to those skilled in the art that a multitude of breakpoint-adaptive prediction schemes exist and may potentially be used as alternatives to the simple embodiment described above.

The prediction steps describe the analysis operation typically performed at the encoder. The corresponding synthesis operation required at the decoding stage is now discussed. Ignoring any loss of information, due to for example quantization, the original sample values $d_k[n]$ can be reconstructed using the synthesis operations. For a given level k, the samples for the horizontal and vertical non-root arcs are first reconstructed using data available from the coarser, previously decoded level k+1. Specifically, the reconstruction for the mid point of the horizontal non-root arc is given by $$d_k[n_e+\eta_{10}]=x_k[n_e+\eta_{10}]+P(A_k[n_e+\eta_{10}], d_{k+1}[\tfrac{1}{2}n_e], d_{k+1}[\tfrac{1}{2}n_e+\eta_{10}])$$

where $x_k[n_e+\eta_{10}]$ refers to the residue data and was defined in earlier discussions in this section. Similarly, the reconstruction for the mid point of the vertical non-root arc is specified by $$d_k[n_e+\eta_{01}]=x_k[n_e+\eta_{01}]+P(A_k[n_e+\eta_{01}], d_{k+1}[\tfrac{1}{2}n_e], d_{k+1}[\tfrac{1}{2}n_e+\eta_{01}]).$$

Finally the centre point of the root arcs is reconstructed; this process starts by using the synthesized sample values on the non-root arcs to produce predictions $$h_{root} = P(A_k[n_e], d_k[n_e+\eta_{01}], d_k[n_e+\eta_{21}]); \text{ and}$$

$$v_{root} = P(A_k[n_e+\eta_{11}], d_k[n_e+\eta_{10}], d_k[n_e+\eta_{12}]).$$

These predictions are then averaged and added to the corresponding residue value such that $$d_k[n_e+\eta_{11}] = x_k[n_e+\eta_{11}] + \tfrac{1}{2}[h_{root}+v_{root}].$$

Breakpoint Adaptive DWT

Update steps can be included to generalize the predictive scheme to a lifting implementation of a breakpoint adaptive DWT (BPA-DWT). One embodiment of BPA-DWT, which builds on the predictive step explained in the previous section, is explained in the ensuing text.

The BPA-DWT is implemented using the lifting structure where the associated predict and update steps are adapted to the presence of breakpoints. For a given level k, we use the notation $x_k[n]$ to refer to the output transform coefficients of input samples $d_k[n]$. The transform is conducted in two phases. The first phase relates to the predict and update steps for non-root arcs while the second phase includes the prediction step for samples at the intersection of two root arcs and the corresponding update step. We use the notation $x_k^{(1)}[n]$ and $x_k^{(2)}[n]$ to refer to the output of the first and second phases respectively, with $x_k[n]=x_k^{(2)}[n]$.

Phase One

The first prediction step transforms $d_k[n_e+\eta_{10}]$ and $d_k[n_e+\eta_{01}]$ into $x_k^{(1)}[n_e+\eta_{10}]$ and $x_k^{(1)}[n_e+\eta_{01}]$ according to $$x_k^{(1)}[n_e+\eta_i] = d_k[n_e+\eta_i] - P(A_k[n_e+\eta_i], d_k[n_e], d_k[n_e+2\eta_i])$$

Here, refers to either $\eta_{10}$ or $\eta_{01}$, and P is a breakpoint adaptive prediction operator. Essentially P switches between linear interpolation and zero-order-hold (ZOH) depending on the presence and location of any breakpoint on the arc, as follows $$P = \begin{cases} \dfrac{d_k[n_e] + d_k[n_e+2\eta_i]}{2} & A_k[n_e+\eta_i] = 0 \\ d_k[n_e] & A_k[n_e+\eta_i] = -1 \\ d_k[n_e+2\eta_i] & A_k[n_e+\eta_i] = 1 \end{cases}$$

where $A_k[n_e+\eta_i]=0$ means there are no breakpoints on the arc, while the values 1 and −1 correspond to breaks on the left and right half of the arc respectively. As for the other two locations, $x_k^{(1)}[n_e+\eta_{11}]=d_k[n_e+\eta_{11}]$, while $x_k^{(1)}[n_e]$ is obtained via the following update step:

$$x_k^{(1)}[n_e] = d_k[n_e] + \sum_{\eta_i \in \{\eta_{10}, \eta_{01}, \eta_{-10}, \eta_{0-1}\}} \beta^{(1)} \cdot (1 - |A_k[n_e+\eta_i]|) \cdot x_k^{(1)}[n_e+\eta_i]$$

We set $\beta^{(1)}=\frac{1}{6}$, which ensures that the synthesis filters associated with subband samples $x_k[n_e+\eta_{01}]$ and $x_k[n_e+\eta_{10}]$ have DC gain of 0, in the absence of arc breakpoints. The update contribution from these samples is zero if a breakpoint is present on the arc; this means that update steps never operate in the vicinity of detected discontinuity boundaries.

Phase Two

The second prediction step converts $x_k^{(1)}+[n_e+\eta_{11}]=d_k[n_e+\eta_{11}]$ into a prediction residual $x_k^{(2)}[n_e+\eta_{11}]$, after which a final update step distributes a portion of this residual signal back to the samples that were used to form the prediction. To describe these steps, it is helpful to define $U_k^{(2)}[n_e+\eta_{11}]$ to be 1 if all 6 arcs in the immediate neighborhood of the location $n_e+\eta_{11}$ are empty, and 0 otherwise. These 6 arcs include the two root arcs that intersect at $n_e+\eta_{11}$ and the four surrounding non-root arcs—see FIG. 2. The prediction and update steps are given by $$x_k^{(2)}[n_e+\eta_{11}] = x_k^{(1)}[n_e+\eta_{11}]$$
$$- \tfrac{1}{2} P(A_k[n_e+\eta_{11}], x_k^{(*)}[n_e+\eta_{10}], x_k^{(*)}[n_e+\eta_{12}])$$
$$- \tfrac{1}{2} P(A_k[n_e], x_k^{(*)}[n_e+\eta_{01}], x_k^{(*)}[n_e+\eta_{21}])$$

$$x_k^{(2)}[n_e] = \beta_a^{(2)} \sum_{\eta_i \in \{\eta_{11}, \eta_{1-1}, \eta_{-11}, \eta_{-1-1}\}} x_k^{(2)}[n_e+\eta_i] \cdot U_k^{(2)}[n_e+\eta_i]$$

$$x_k^{(2)}[n_e+\eta_{01}] = \beta_b^{(2)} \sum_{\eta_i \in \{\eta_{11}, \eta_{-11}\}} x_k^{(2)}[n_e+\eta_i] \cdot U_k^{(2)}[n_e+\eta_i]$$

$$x_k^{(2)}[n_e+\eta_{10}] = \beta_b^{(2)} \sum_{\eta_i \in \{\eta_{1-1}, \eta_{11}\}} x_k^{(2)}[n_e+\eta_i] \cdot U_k^{(2)}[n_e+\eta_i]$$

Here, the $x_k^{(*)}$ take values only at the end-points of root arcs; these are derived from sample values found within $x_k^{(1)}$ by partially unwinding the prediction and update steps in phase one. Specifically, for each $n_e \in \{\eta_{01}, \eta_{10}\}$, we assign $x_k^{(*)}[n_e+\eta_i]$ equal to $$\begin{cases} x_k^{(1)}[n_e+\eta_i] + x_k^{(1)}[n_e] & A_k[n_e+\eta_i] = -1 \\ x_k^{(1)}[n_e+\eta_i] + x_k^{(1)}[n_e+2\eta_i] & A_k[n_e+\eta_i] = 1 \\ \tfrac{5}{6} x_k^{(1)}[n_e \eta_i] + \dfrac{x_k^{(1)}[n_e] + x_k^{(1)}[n_e+2\eta_i]}{2} & A_k[n_e+\eta_i] = 0 \end{cases}$$

The idea here is that $x_k^{(*)}[n_e+\eta_i]$ should be close to $d_k[n_e+\eta_i]$, so that $x_k^{(2)}[n_e+\eta_{11}]$ can be understood as the difference between $d_k[n_e+\eta_{11}]$ and a break-point sensitive average of its four most immediate neighbors in the depth map at level k. The formulation given above ensures that $x_k^{(*)}[n_e+\eta_{10}]$ is exactly equal to $d_k[n_e+\eta_{10}]$ so long as the nearby prediction residuals $x_k^{(1)}[n_e+\eta_{-10}]$, $x_k^{(1)}[n_e+\eta_{0-1}]$, $x_k^{(1)}[n_e+\eta_{01}]$, $x_k^{(1)}[n_e+\eta_{30}]$, $x_k^{(1)}[n_e+\eta_{2-1}]$ and $x_k^{(1)}[n_e+\eta_{21}]$ are all zero; a similar statement can be made for $x_k^{(*)}[n_e+\eta_{01}]$.

The second update step uses factors $\beta_a^{(2)}=0.04701$ and $\beta_b^{(2)}=0.1479$. These values are obtained by minimizing the L2 norm of the synthesis filter associated with subband samples $x_k[n_e+\eta_{11}]$ to 0 and forcing its DC gain to 0.

At the decoder, the corresponding breakpoint adaptive synthesis operations can be performed to recover sample data $d_k[n]$ from the transformed coefficients $x_k[n]$. At a given level k, the central location $d_k[n_e+\eta_{11}]$ is first determined using samples and breakpoint information of all 6 arcs in the immediate neighborhood of the location $n_e+\eta_{11}$. Following this, the samples at mid-points of non-root arcs are calculated; first reversing the update step and then forming a prediction which is then added to the decoded residue data.

Numerical Representation of Vertices on Arcs

In this embodiment, each arc $A_k[n]$ can potentially be assigned a vertex $v_k[n]$ that identifies the location of a discontinuity within the arc. An embodiment represents vertices as $$v_k[n] = \xi_k[n] \cdot 2^{p_k[n]} \cdot m_k[n],$$

where $\xi_k[n] \in \{-1,1\}$ conveys the sign information, $p_k[n] \geq 0$ signifies the priority of the vertex and $m_k[n]$ is the vertex magnitude described by a (k+1)-bit unsigned integer. In the embodiment, $m_k[n]=0$ is interpreted as the absence of a vertex, meaning that a breakpoint can exist on the arc only if it is induced from breakpoints at coarser resolutions; otherwise, the most significant bit (MSB) of $m_k[n]$ is set to 1.

In embodiments, the vertex values $v_k[n]$ are subjected to embedded bit-plane coding. Specifically, the $v_k[n]$ are expressed in sign-magnitude form and a bit-plane coding procedure encodes the magnitude bits of these vertices, starting from the most significant bit plane and working towards the least significant bit-plane, encoding the sign bit of $v_k[n]$ only after its first non-zero magnitude bit is encountered.

For each vertex $v_k[n]$, the value of $p_k[n]$ determines the relative point in the embedded bit-stream at which the presence of the vertex is first identified. Only the sign bit $\xi_k[n]$ affects the behavior of the breakpoint-adaptive transform at resolution level k; as explained above the sign information is communicated along with the first non-zero magnitude bit of $v_k[n]$, which corresponds to the MSB ($k+1^{th}$ bit position) of $m_k[n]$. Additional magnitude bit-planes of $m_k[n]$ provide refined location information which allows breakpoints to be induced at finer levels, affecting the breakpoint-adaptive transform at these finer resolutions.

In scalable dissemination applications, it is expected that decoders will often be presented with only a leading prefix of the associated embedded bit-stream, from which they can recover only a subset of the bit-planes for any given vertex. In preferred embodiments of the invention, if a decoder is unable to recover the least significant $\beta$ bits of $m_k[n]$ the vertex is not used to induce breakpoints on any arc in level $\beta-1$ or below.

Prioritization of Vertex Data for Embedded Coding

In an embodiment of the invention, as mentioned in Section 3.3, each vertex $v_k[n]$ has an exponent factor $p_k[n]$ that determines the point in the embedded bit-stream at which the vertex gets signalled; larger values for $p_k[n]$ shift the magnitude value $m_k[n]$ to more significant bit-planes, effectively assigning it a higher priority in the embedded bit-stream generated using the methods described in Section 3.4. To order the vertex data in accordance with its impact on R-D performance, this embodiment of the invention assigns $p_k[n]$ in such a way that $p_k[n] \approx \log_2(\Delta D_{k,n}/\Delta L_{k,n})$ where $\Delta D_{k,n}$ and $\Delta L_{k,n}$ model the decrease in total distortion and increase in the number of coded bits that can be attributed to the least significant bit (LSB) of $m_k[n]$. This is a reasonable approach and one that is adopted by this embodiment of the invention; however alternative methods can also be used to determine priority levels of vertices. The breakpoints induced by a vertex generally depend upon other vertices, which makes it difficult to definitively attribute distortion reduction to individual vertices. To allow vertex priorities to be readily calculated, implementations of the invention are expected to use various simplifications and assumptions to calculate $\Delta D_{k,n}$ and $\Delta L_{k,n}$. The ensuing text describes a simplified model that is used by an embodiment of the invention.

To capture dependencies between vertices, a given vertex $v_k[n]$ is considered in conjunction with an adjacent breakpoint (vertex or induced breakpoint) in the same level k, such that the connecting line segment between the pairs of vertices can induce breakpoints at finer levels. To approximate the progressive nature in which arc-band and sub-band information is disseminated, the calculations assume that for a given vertex $v_k[n]$, all vertices at the same and coarser resolution levels are present, while none are present at finer resolution levels. Moreover, it is assumed that all sub-band samples influenced by the vertex and its adjacent breakpoint have negligible magnitude[1]. With these assumptions in place, $\Delta D_{k,n}$ is calculated as the increase in distortion that would be experienced if the LSB of $m_k[n]$ was omitted from the representation of vertex $v_k[n]$. The contribution of this LSB to the compressed representation is approximated by $\Delta L_{k,n}=1$ bit. Any modification to the representation of $v_k[n]$ will cause a displacement of the line segment defined by both $v_k[n]$ and its adjacent vertex; therefore calculations for $\Delta D_{k,n}$ are based upon changes to this line segment's representation, as recovered by a decoder that is missing the LSB of $m_k[n]$.

[1] Since the priority assignment is concerned with the discarding of bits from the vertex representation, it is reasonable to assume that sub-band data (or prediction residuals) are effectively quantized in the decoder, to the point where that small sub-band samples will appear to be zero.

In embodiments, $\Delta D_{k,n}$ is approximated by $l_{k,n} \cdot G_{k,n}$ where $l_{k,n}$ is the length of the line segment and $G_{k,n}$ is a measure of the difference in sample values across the linear edge that it defines. Simplifications can be made in the calculations of $l_{k,n}$ and $G_{k,n}$. In this embodiment, the length of the line segment induced by $v_k[n]$ and its adjacent breakpoint is approximated to be the arc length at the next finer level k−1, that is $l_{k,n}=2^k$. For cases where $v_k[n]$ has no adjacent breakpoints with which to form a line segment, a default value of $l_{k,n}=2^{k-1}$ is used. The value for $G_{k,n}$ can be calculated by various methods; one simple example, used in an embodiment, is to determine the difference in sample data across the arc on which the vertex $v_k[n]$ is located; alternatively the average or maximum difference value can be used considering sample differences across all arcs that the line segment intersects at the current level k. On occasions where a vertex $v_k[n]$ is part of two separate line segments with lengths $l_{k,n}^{(1)}$ and $l_{k,n}^{(2)}$, the corresponding changes in distortion $\Delta D_{k,n}^{(1)}$ and $\Delta D_{k,n}^{(2)}$ for the two line segments can be calculated separately and then accumulated to get the total change in distortion $\Delta D_{k,n}$. In this embodiment, each vertex at each level is considered in turn and the same procedure is applied to determine $\Delta D_{k,n}$ and $\Delta L_{k,n}$ and hence $p_k[n]$.

The preferred priority assignment procedure described above has the property that corresponding bit-planes have comparable significance across all arc-bands. This property may be exploited by some implementations of the embedded bit-plane coding step, as discussed in Section 3.4.

Coding Strategies

The representation proposed in this embodiment involves two completely regular multi-resolution 2D fields, $x_k[n]$ and $v_k[n]$—essentially two image pyramids, which can be scalably encoded and incrementally disseminated. These two pyramids are illustrated in FIG. 3(b).

For this embodiment of the invention, the sub-band data formed at each level are coded directly using the JPEG 2000 algorithm. This involves partitioning the LH, HL and HH sub-bands at each resolution level into code-blocks and then creating an embedded bit-stream representation for each code-block. These embedded bit-streams are partitioned into a sequence of rate-distortion optimized quality layers in the usual way D. S. Taubman and M. W. Marcellin, *JPEG2000: Image Compression Fundamentals, Standards and Practice*.

Kluwer Academic Publishers Group, 2002, imparting resolution and quality scalability to the final codestream.

The embodiment enables geometry data to be treated in the same way, allowing vertices $v_k[n]$ to be coded using similar techniques to those used for sub-band data. In embodiments of the invention, the arcs are partitioned into two arc-bands for each resolution: one arc-band holds the vertices $v_k[n_e]$ and $v_k[n_e+\eta_{11}]$ for the root arcs; the other arc-band holds the vertices for non-root arcs, since these tend to have quite different statistical properties. Embodiments of the invention divide each arc-band data into code-blocks; embedded coding is then carried out on a code block basis.

As discussed above, embodiments of the invention represent vertices in sign-magnitude form; this allows the magnitude and sign information to be coded progressively using a context driven binary arithmetic coder. The following text provides details on the bit-plane coding schemes employed by embodiments of the invention. In this explanation, the notation p is used to refer to a specific bit-plane, $B_{k,b}$ is used to refer to a specific code-block at level k and $v_{k,b}[n]$ is used to describe a specific vertex at location n within $B_{k,b}$. Furthermore, $p_{k,b}[n]$ is used to refer to the priority value of a vertex $v_{k,b}[n]$ such that $$2^{p_{k,b}[n]} \cdot m_{k,b}[n]$$

represents the prioritized vertex magnitude; and the notations $$p_{k,b}^{max} \text{ and } p_{k,b}^{min}$$

are employed to signify the respective maximum and minimum values of $p_{k,b}[n]$ within $B_{k,b}$. The coding process for code-block $B_{k,b}$ starts at the most significant magnitude bit-plane $$p_{k,b}^{max} + k$$

and proceeds to the least significant bit-plane $$p = p_{k,b}^{min}.$$

The values $$p_{k,b}^{max} \text{ and } p_{k,b}^{min}$$

are explicitly communicated to the decoder through the encoding scheme.

For each arc location n of code-block $B_{k,b}$, a binary significance state $\sigma_{k,b}[n]$ is maintained to identify whether or not the first non-zero bit plane of the prioritized vertex magnitude $$2^{p_{k,b}[n]} \cdot m_{k,b}[n]$$

has been coded. More specifically, the significance state of all arc locations are initialized to zero (i.e. $\sigma_{k,b}[n]=0$) at the start of the coding process and switched to $\sigma_{k,b}[n]=1$ immediately after coding the first non-zero magnitude bit of $$2^{p_{k,b}[n]} \cdot m_{k,b}[n].$$

When coding each bit-plane of a code-block $B_{k,b}$, embodiments of the invention employ three different types of primitive coding operations. At a particular bit-plane p, if the significance state at a given location is $\sigma_{k,b}[n]=0$ then the coding of $$2^{p_{k,b}[n]} \cdot m_{k,b}[n]$$

is regarded as significance coding. If $\sigma_{k,b}[n]=0$ and the prioritized magnitude value $$2^{p_{k,b}[n]} \cdot m_{k,b}[n]$$

at the current bit-plane p is non-zero then the vertex is considered to become significant and $\sigma_{k,b}[n]$ is set to 1; otherwise $\sigma_{k,b}[n]$ remains 0. A non-zero vertex $v_{k,b}[n]$ becomes significant at bit-plane $p=k+p_{k,b}[n]$; therefore communicating a transition in the significance state $\sigma_{k,b}[n]$ is essentially conveying the priority value $p_{k,b}[n]$ of $v_{k,b}[n]$. The significance coding primitive codes the binary value of $\sigma_{k,b}[n]$ in all bit planes $p \geq k+p_{k,b}[n]$.

When the prioritized vertex magnitude $$2^{p_{k,b}[n]} \cdot m_{k,b}[n]$$

becomes significant, a sign coding primitive is invoked to convey the sign $\xi_{k,b}[n]$ of the vertex $v_{k,b}[n]$.

After a vertex $v_{k,b}[n]$ has become significant, a refinement coding primitive is invoked to code each of the remaining magnitude bits of $$2^{p_{k,b}[n]} \cdot m_{k,b}[n]$$

so as to progressively refine the magnitude information from previously coded bit-planes. Specifically, each refinement bit at bit-plane p where $k+p_{k,b}[n]>p \geq p_{k,b}[n]$ is coded as part of the binary bit-plane coding of $B_{k,b}$. When all k bits subsequent to the first non-zero bit-plane $k+p_{k,b}[n]$ have been considered, the coding process for $v_{k,b}[n]$ is complete.

According to the above description, the coding of $v_{k,b}[n]$ is not considered complete until all k+1 bits of $m_{k,b}[n]$ have been encoded using the appropriate coding primitives. If the decoder receives only a subset of the coded bit-planes, it will generally fail to recover some least significant bits for some of the $m_{k,b}[n]$ values. Which specific bits are missing depends upon the number of bit-planes omitted and the priorities values $p_{k,b}[n]$ In some embodiments of the invention, it may be desirable to explicitly terminate the encoding of individual vertices at some point prior to the least significant bit of $m_{k,b}[n]$. The potential advantage that this brings is that the decoder can be prevented from using vertex $v_{k,b}[n]$ to induce breakpoints at resolution levels below level $\beta$, where $\beta$ is the number of least significant bits of $m_{k,b}[n]$ that follow the point at which coding of $v_{k,b}[n]$ is terminated. The R-D optimization method described in Section 3.5 can take advantage of this option, if available. In such embodiments, a termination coding primitive is introduced immediately before each magnitude refinement coding primitive. The termination primitive codes a binary symbol $\tau_{k,b}[n]$ for the relevant location n, where $\tau_{k,b}[n]=0$ means that coding is not terminated and the refinement coding primitive follows, while $\tau_{k,b}[n]=1$ means that all coding for $v_{k,b}[n]$ is complete.

All primitive coding operations involve the coding of binary events. Embodiments of the invention code these events using context-adaptive binary arithmetic coding. Various strategies can be employed to define the conditioning contexts used by the binary arithmetic coding and decoding procedures. In certain embodiments of the invention, a context for each binary coding primitive is constructed using only information that has already been coded for vertices on neighboring arcs that belong to the same code block. This is referred to as intra-block context adaptive coding; in this case, the encoded bit-streams generated for each code-block can be decoded independently.

In one embodiment of intra-block context adaptive coding, contexts for a given location n are formed from the significance state associated with up to three neighboring locations within the code-block. More specifically, the context used for significance coding of $v_b[n]$ in bit-plane p is composed of the significance states $\sigma_{k,b}[n_i]$ of the locations $n_i$ that correspond to the two neighboring arcs of the same orientation (so long as these lie within the code-block) and one nearest arc of the opposite orientation; this provides 8 possible contexts for significance coding. The reader skilled in the art will appreciate that information from various combinations of neighboring arcs from the same code block can be used to formulate contexts for each primitive coding procedure. The embodiment is not limited to any particular combination of arcs and the example discussed above is provided purely to illustrate one embodiment of the intra-block scheme. The reader skilled in the art will also understand that there are many similarities between the intra-block context adaptive coding method and the EBCOT coding procedure specified by JPEG 2000 for the coding of sub-band data; the main difference between the two methods lies in the way that arithmetic coding contexts are formed.

Alternative embodiments of the invention can employ inter-band context adaptive coding where in addition to using coded vertex data from the current code-block to build context for binary coding primitives, vertex information of arcs located at coarser resolution levels is also used. These arcs belong to code-blocks at corresponding coarser resolution levels and in this explanation these code-blocks are referred to as ancestors of the current code-block. To construct appropriate context for coding bit-plane p of the current code-block $B_{k,b}$ the inter-band context adaptive coding method utilizes bit-planes $p+\Delta$ and above from ancestor code-blocks. This imposes constraints on the R-D optimized sequencing of code-block data which is performed during the PCRD phase as explained below. As it turns out, the vertex prioritization scheme described above ensures that these constraints should not overly impact the rate-distortion properties of the quality layers produced by the PCRD method so long as $\Delta \geq 0$. This is because the prioritization scheme used in embodiments of the invention approximately equalizes the rate-distortion slope associated with bit-plane p across all code-blocks in all arc-bands.

Figure 4:
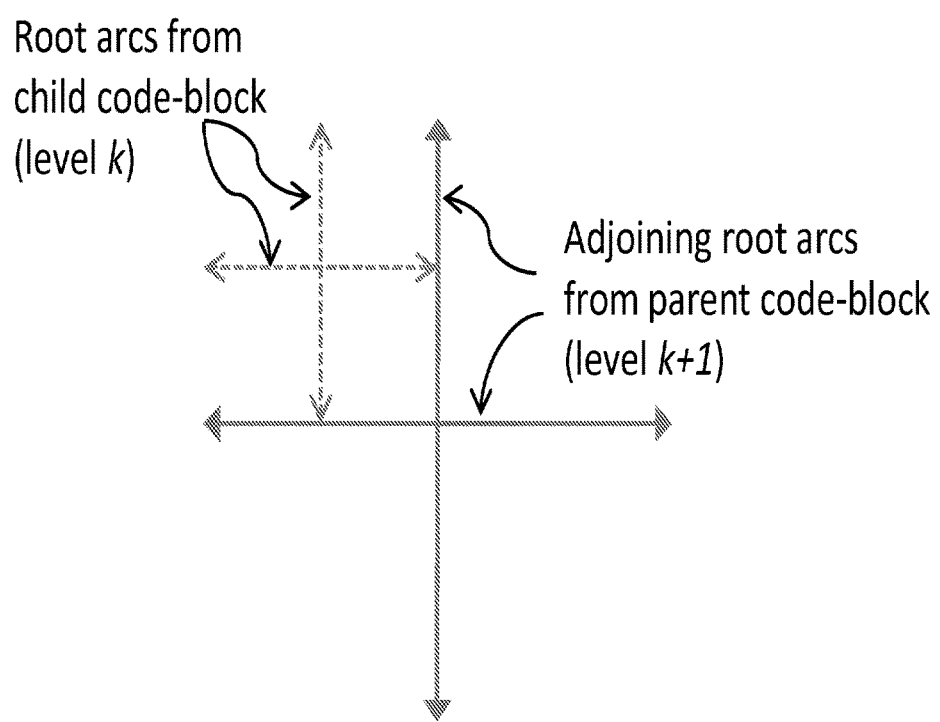
FIG. 4 is a diagram showing an example of root arcs from the parent coat-block used for context modeling of root arcs from the child.

One embodiment of inter-band context adaptive coding is now explained for root arc-bands. In this embodiment, for coding vertices on arcs at level k, vertices contributing to inter-band contexts are restricted to the immediate coarser resolution level k+1 and the value for $\Delta=1$. Specifically, let $A_k[n_e]$ and $A_k[n_e+\eta_{11}]$ represent two root arcs included in code-block $B_{k,b}$. The context for coding bit-plane p of $A_k[n_e]$ or $A_k[n_e+\eta_{11}]$ is constructed using available information from the code-block $B_{k,b}$ (as explained in the intra-block context adaptive coding method), as well as the values of $$\left\lfloor 2^{-(p+\Delta)} \cdot \left|v_{k+1}\left[\frac{1}{2}n_e\right]\right|\right\rfloor = \left\lfloor 2^{p_{k+1}[\frac{1}{2}n_e]-\Delta-1} \cdot m_{k+1}\left[\frac{1}{2}n_e\right]\right\rfloor$$

and $$\left\lfloor 2^{-(p+\Delta)} \cdot \left|v_{k+1}\left[\frac{1}{2}n_e + \eta_{11}\right]\right|\right\rfloor = \left\lfloor 2^{p_{k+1}[\frac{1}{2}n_e+\eta_{11}]-\Delta-1} \cdot m_{k+1}\left[\frac{1}{2}n_e + \eta_{11}\right]\right\rfloor$$

corresponding to magnitude bit-planes p+1 and above from the adjoining root-arcs $A_{k+1}[\frac{1}{2}n_e]$ and $A_{k+1}[\frac{1}{2}n_e+\eta_{11}]$ at level k+1. An example showing the adjoining root arcs from the coarser resolution level k+1 is illustrated in FIG. 4. The ancestor code-blocks for $B_{k,b}$ are those code-blocks that contain the adjoining root arcs in level k+1 for the root arcs found in $B_{k,b}$.

In one embodiment, inter-band contexts are used only for the significance coding primitives encountered in root arc-bands. Moreover, for significance coding of $v_k[n_e]$ and $v_k[n_e+\eta_{11}]$ in bit-plane p, one of four contexts is used, based on whether or not $|v_{k+1}[\frac{1}{2}n_e]| \geq 2^{p+\Delta}$ and whether or not $|v_{k+1}[\frac{1}{2}n_e+\eta_{11}]| \geq 2^{p+\Delta}$. This inter-band context information may be interpreted as the significance to bit-plane $p+\Delta$ of the adjoining root arcs from resolution level k+1.

For the HL arc-band, the same inter-band context adaptive coding method can be employed for context modeling where arcs from coarser resolution levels are considered. Unlike HH arc-bands, which hold the root arcs at each level, HL arc-bands describe finer sub-divisions of arcs that exist at coarser levels. This difference in the nature of HL arc-bands means that they are less likely to benefit from inter-band coding than HH arc-bands.

A reader skilled in the art will appreciate that more complex context modeling strategies are possible by including various combinations of arcs from a number of coarser resolution levels.

Rate-Distortion Optimization

Embodiments of invention perform rate-distortion (R-D) optimization in two phases. The first phase relates to R-D optimization for selecting vertices in such a way as to optimize the overall compressed representation, assuming that all data are available to the decoder. The second phase considers R-D optimized embedding of the vertex and sub-band data fields. Details of both phases are presented below, starting with a discussion on the global R-D cost function.

Global R-D Cost Function

In embodiments of the invention, decisions regarding the presence and precision of vertices are made with the goal of minimizing a global Lagrangian cost $J=D+\lambda L$, where D represents distortion in the decoded spatial domain, L the coded length and $\lambda$ is a Lagrangian multiplier. When considering the placement of vertices, the overall distortion and length implications are not directly accessible, especially because the distortion depends upon the interaction between the sub-band data and the vertex field. For this reason, an approximate model for the total Lagrangian cost is employed. The total squared error and total coded length are modeled as $$D = \sum_{s,n} D_{s,n} = \sum_{s,n} G_s E_{s,n} \cdot e^{-\alpha L_{s,n}}$$

$$L = \sum_{s,n} (L_{s,n} + L_{s,n}^\sigma) + \sum_{a,n} (L_{a,n} + L_{a,n}^\sigma)$$

where $E_{s,n}$ is the square of the residue or sub-band coefficient produced by the BPA-DWT at location n in sub-band s, $G_s$ is the synthesis energy gain for the corresponding sub-band and $\alpha \approx 2 \ln 2$ [13].

The length term L in equation (3) consists of the bits required for coding sub-band data and the bits for coding vertex data, the latter being indexed by location n and arc-band a. In an embodiment of the invention, the EBCOT coding strategy is used for the sub-band data and the context adaptive methods described in above are used for the arc-band data. Essentially both forms of coding share the same coding steps; this involves coding a significance state, followed by sign and magnitude bit-planes for samples that are known to be significant. The significance state information has the most skewed probability distributions, effectively communicating the identities of the non-zero sub-band samples and breakpoints. In the preferred embodiment of the invention, for the purpose of R-D optimization, it is assumed that the number of bits required for arithmetic coding of the significance state is $L_{\cdot,n}^\sigma = -\log_2 P_{\cdot,n}^\sigma$ if location n is significant (non-zero) and $L_{\cdot,n}^\sigma = -\log_2 (1-P_{\cdot,n}^\sigma)$ otherwise. Here, $L_{\cdot,n}^\sigma$ stands for $L_{s,n}^\sigma$ in the case of sub-band data and $L_{a,n}^\sigma$ in the case of arc vertex data, while $P_{\cdot,n}^\sigma$ is the assumed probability (or frequency) of non-zero values in the relevant sub-band s or arc-band a. The probabilities $P_{a,n}^\sigma$ and $P_{s,n}^\sigma$ are estimated from the outcomes observed for previous coded sub-bands.

In equation (3), the terms $L_{s,n}$ and $L_{a,n}$ refer to the number of bits required to code sign and magnitude bits; these are non-zero only at the significant locations n. In an embodiment of the invention, $L_{a,n}$ is taken to be equal to the precision of the breakpoint at location n for the purpose of R-D optimization. Alternative embodiments of the invention can use better estimates of $L_{a,n}$ based on probability models that are a function of local context.

For a given vertex configuration, the optimal number of bits to assign to sub-band coefficients is determined by setting $$\frac{\partial D_{s,n}}{\partial L_{s,n}} = -\lambda,$$

subject to the constraint $L_{s,n} \geq 0$. From this it can be deduced that $$J_{s,n} = D_{s,n} + \lambda L_{s,n} = J_s(E_{s,n}), \text{ where}$$

$$J_s(x) = \frac{\lambda}{\alpha} \begin{cases} 1 + \ln \rho_s x & \rho_s x > 1 \\ \rho_s x & \text{otherwise} \end{cases} \text{ and } \rho_s = \frac{G_s \alpha}{\lambda}$$

and also $$\lambda L_{s,n}^\sigma = J_s^\sigma(E_{s,n}) = \lambda \begin{cases} -\log_2 P_s^\sigma & \rho_s E_{s,n} > 1 \\ -\log_2(1 - P_s^\sigma) & \text{otherwise} \end{cases}$$

These relationships capture the dependence of all sub-band related terms from equations (2) and (3) on the residual energies $E_{s,n}$ associated with a given vertex configuration, through position independent functions $J_s()$ and $J_s^\sigma()$. To compare the value of two different vertex configurations V and V', all that is required is to evaluate the change in J, in accordance with the breakpoint fields induced by V and V' respectively. In the equations below, the change in $J_{s,n}$ is evaluated over D(V,V'), the set of sub-band samples whose energies $E_{s,n}$ depend upon vertices that are found in V\V' or V'\V.

$$J_V - J_{V'} = \sum_{(s,n) \in D(V,V')} [J_s(E_{s,n,V}) - J_s(E_{s,n,V'})] + [J_s^\sigma(E_{s,n,V}) - J_s^\sigma(E_{s,n,V'})] +$$

$$\lambda \sum_{(a,n) \in V \setminus V'} \log_2 \frac{1 - P_a^\sigma}{P_a^\sigma} - \lambda \sum_{(a,n) \in V' \setminus V} \log_2 \frac{1 - P_a^\sigma}{P_a^\sigma}$$

R-D Optimized Vertex Placement

In this embodiment, identifying the set of sub-band samples that depend on a set of vertices is simple if we ignore the option of inducing breakpoints on root arcs from vertices at coarser levels. Casting the hierarchical grid structure as a tree representation, each arc $A_k[n]$ can be understood as the parent of two arcs $A_{k-1}[m]$ in the next finer level of the hierarchy. A vertex on $A_k[n]$ can only affect the sub-band sample at the centre of arc $A_k[n]$ and the sub-band sample at the centre of at most one descendent arc $A_j[m]$ at each level j<k. This parent to child dependency means that the Lagrangian cost J can be globally minimized using tree pruning strategies.

Embodiments of the invention can induce breakpoints on a root arc $A_k[n]$ by vertices placed at levels greater than k; this makes the dependencies between sub-band samples and vertices more complex and the task of finding the globally optimal representation difficult. To address this problem, embodiments of the invention augment the bottom-up tree pruning strategy with a targeted search at each resolution for beneficial vertex combinations that induce breakpoints at finer resolutions. The resulting optimization procedure is somewhat greedy, but preserves the global optimality of the tree pruning approach at least for those vertices that do not induce breakpoints on root arcs at finer levels.

In an embodiment of the invention, the optimization procedure starts at the finest resolution level (k=0) and identifies the vertices at that level whose presence minimizes the Lagrangian cost J; this is simple because each $v_0[n]$ affects the energy $E_0[m]$ of only one sub-band sample. At each successive level k>0, various options for the placement of vertices are evaluated, this time taking note of the fact that vertices may induce breakpoints at finer levels. The usual tree pruning approach allows us to remove redundant vertices on child arcs and the benefit of this is fully accounted for during the optimization procedure; however tree pruning is not amenable to handling induced breakpoints on root arcs (as opposed to child arcs) in finer resolution levels. Therefore an embodiment of the invention augments the tree pruning paradigm by including the option of pruning away any contradicting vertices on root arcs at finer levels. This augmented pruning strategy is able to take into account the impact on root and non-root arcs at finer levels to discover the vertex configuration that produces the greatest reduction in J.

The ability to induce breakpoints on root arcs at finer levels means that a vertex placed on an arc can affect sub-band samples on either side of the arc. This essentially creates spatial dependency between arcs which makes finding a global optimal solution difficult. To address this problem, an embodiment of the invention limits the spatial region for which distortion impacts are evaluated. For a given level, attention is restricted to a single square region S as shown by the outer dashed box in FIG. 2; S includes 6 arcs from the current level which define the perimeter of the square and all arcs at finer levels that are contained within s. With this restriction in place, changes in Lagrangian cost J for different vertex configurations V and V' are evaluated by inducing the corresponding breakpoint fields, restricted to s. Effectively, this means that the dependencies D(V,V') of equation (4) are artificially limited to s, which may result in some sub-optimality. To consider vertex combinations for all arcs at a given level, the region s is interpreted as a single square on a checkerboard and optimization is initially performed for only those arcs that affect the white squares. Note that Arcs belonging to a white square s have no impact on the distortion in other white squares. In a second stage, attention is restricted to the black squares, considering only those arcs that are not shared with the white squares.

Figure 5:
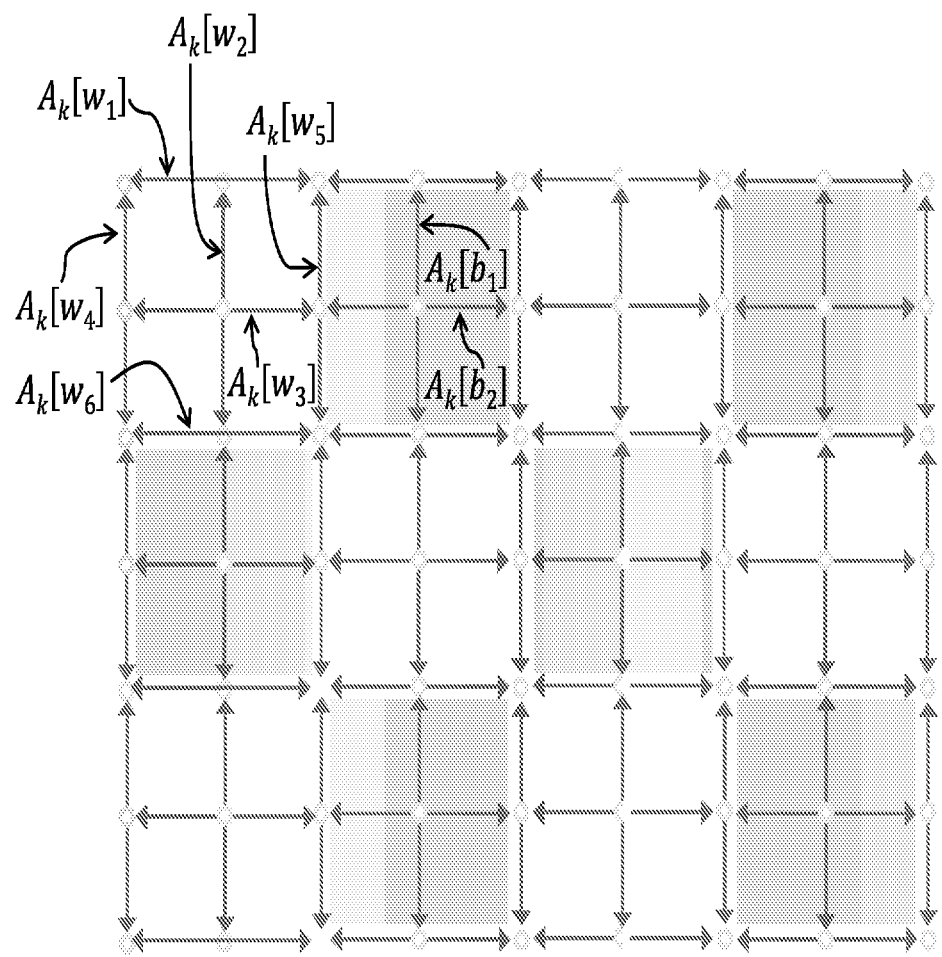
FIG. 5 shows a checkerboard pattern at level k. White squares are considered first, followed by the black (shaded squares). Arcs belonging the top left white square are labeled.

An example of the checkerboard pattern is illustrated in FIG. 5 for a given level k; for the sake of simplicity, arcs from finer levels have been omitted from the diagram. The white squares show regions that are considered during the first stage. As an example, the perimeter of the top-left white square is defined by arcs labelled $A_k[w_1]$, $A_k[w_4]$, $A_k[w_5]$ and $A_k[w_6]$; this white square is defined to include all six arcs $A_k[w_1]$ to $A_k[w_6]$ from the current level k as well arcs at finer levels contained within or on the perimeter of the square. The black or shaded squares show regions that are evaluated during the second stage. A black square contains arcs that are not shared with the white squares, this means two arcs from level k and arcs from finer levels that are contained totally inside the perimeter of the square. Two arcs from level k that belong to a particular, single black square are labelled $A_k[b_1]$ and $A_k[b_2]$ in the figure.

Post Compression R-D (PCRD) Optimization

The embodiment allows incremental data from each code block to be organized into quality layers. In the preferred embodiment of the invention, the content of each layer q is determined by a distortion-length slope threshold $\Lambda_q$, so that for each q, a decoder that receives only the first q quality layers should have an approximately optimal representation, given the number of bits contained within these layers. Quality layers for the sub-band data are generated in the conventional way, with rate-distortion properties of the individual EBCOT coding passes determined by scaling calculated sub-band distortions by the energy gain factors $G_s$.

For the vertex data, an embodiment of the invention adopts the following scheme to distribute incremental arc-band code-block contributions to quality layers. For a code-block $B_{k,b}$, let $L_{k,b}(p)$ denote the smallest number of bits from the embedded bit-stream of the code-block, required to decode bit-plane p. Furthermore, let $\rho_{k,b}$ be a variable representing the least significant bit-plane of code-block $B_{k,b}$ that has been assigned to any quality layer so far; this variable is initialized to most significant magnitude bit-plane $$\rho_{k,b} = p_{k,b}^{max} + k + 1 \text{ of } B_{k,b}.$$

The scheme for forming quality layers starts from the largest slope threshold $\Lambda_1$, corresponding to quality layer q=1, and progresses eventually to the smallest slope threshold $\Lambda_Q$, corresponding to the last quality layer. For each quality layer q, the scheme visits each code-block $B_{k,b}$ of each resolution level k, from coarse to fine, evaluating the increase in actual coded length $\Delta L_{k,b}(p) = L_{k,b}(p) - L_{k,b}(\rho_{k,b})$ and estimating the decrease in distortion $\Delta D_{k,b}(p)$ associated with each $p > \rho_{k,b}$. To estimate $\Delta D_{k,b}(p)$, the scheme considers the reduction in distortion achieved by including the additional bit-planes $\rho_{k,b}-1$ down to p, from code-block $B_{k,b}$, leaving the contributions from all other code-blocks unchanged. In this way the scheme finds the smallest p for which $\Delta D_{k,b}(p)/\Delta L_{k,b}(p) \geq \Lambda_q$; then the next $L_{k,b}(p) - L_{k,b}(\rho_{k,b})$ bits from the block's bit-stream are included in quality layer q and p is replaced with $\rho_{k,b}$ before moving to the next block.

In an embodiment of the invention, changes in code-block distortion $\Delta D_{k,b}(p)$ are estimated based on the method described in Section 3.3.1 for determining changes in distortion of individual vertices. For a vertex $v_{k,b}[n]$ of code-block $B_{k,b}$ the distortion associated with omitting all bit-planes below p is given by $\Delta D_{k,n}(p) = l_{k,n} \cdot G_{k,n} \cdot 2^{p-1}$; this is a generalization of the model specified in Section 3.3.1 which was developed only for the case p=1. Taking $\rho_{k,b}$ as the reference bit-plane, to evaluate the change in distortion $\Delta D_{k,b}(p)$ for a code-block $B_{k,b}$ at bit-plane $p < \rho_{k,b}$, the corresponding changes in distortion of all individual vertices in the code-block $B_{k,b}$ need to be summed, leading to the expression $$\Delta D_{k,b}(p) = \sum_{n \in B_{k,b}} (\Delta D_{k,n}(\rho_{k,b}) - \Delta D_{k,n}(p))$$

To evaluate changes in distortion $\Delta D_{k,b}(p)$, alternative embodiments of the invention can employ full reconstruction using all sub-band and arc-band information that would be available to the decoder at the time of embedding bit-plane p of code-block $B_{k,b}$ into the output bit-stream. The final distortion value can then be calculated directly from the difference between the reconstruction and the original data set. For a given slope threshold $\Lambda_q$, the bit-planes of sub-band data that are made available to the decoder is determined by the EBCOT algorithm. The bit-plane contributions from arc-bands are determined by considering in turn each code-block at each resolution level; staring from the coarsest level and progressively moving to finer resolution levels. To determine the bit-planes of a code-block $B_{k,b}$ that are to be sequenced into the embedded bit-stream, calculations are performed to evaluate the rate-distortion slope $\Delta D_{k,b}(p)/\Delta L_{k,b}(p)$ for bit-planes starting from $p = \rho_{k,b}-1$ assuming all other code-blocks remain unaltered. The value for $\Delta D_{k,b}(p)$ is determined as the difference in distortion that occurs in the reconstructed data set after including bit-plane p of code-block $B_{k,b}$. The value of p is progressively decreased to include further bit-planes into the embedded bit-stream; the process stops when the smallest p is found that satisfies $\Delta D_{k,b}(p)/\Delta L_{k,b}(p) \geq \Lambda_q$. On determining a value for p, the following $L_{k,b}(p) - L_{k,b}(\rho_{k,b})$ bits from the block's bit-stream are included in quality layer q and p is replaced with $\rho_{k,b}$ before moving to the next block.

Embodiments of the invention may be implemented by hardware or by any combination of hardware and software. The invention may be implemented by one or more processors providing encoding devices, decoding devices (e.g. for an image or video compression and decompression system). Optimisation hardware and/or software may also be implemented.

Embodiments of the invention may be implemented by computing systems having computing architecture such as client/server. For example, server computing systems may implement an encoder for encoding images and/or video and client systems may implement decoders for decoding the encoded code and producing the image/video. Any other type of computer architecture may be used to implement encoders and decoders, and the invention is not limited to client/server architecture.

Figure 6:
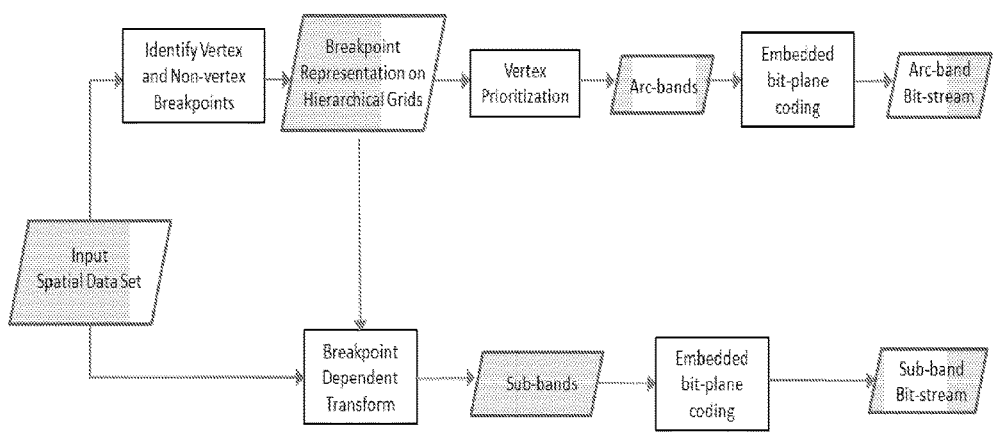
FIG. 6 is a block diagram of an apparatus for encoding spatial data sets in accordance with an embodiment of the present invention.

FIG. 6 shows a functional block diagram of an encoder which may be implemented in accordance with an embodiment of the present invention, by a processing device, such as a server computer system. An arc-band bit-stream and sub-band bit-stream are produced from an input spatial data set. In this embodiment, the spatial data set could be from a depth map, for example. Input spatial data set is processed in accordance with the steps identified in the other blocks, implementing a method in accordance with the embodiment of the present invention, and as described above.

Figure 7:
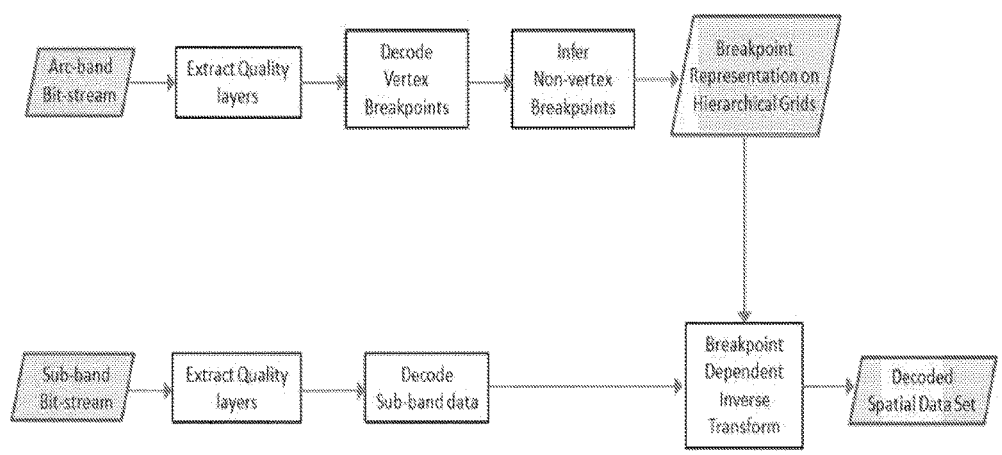
FIG. 7 is a schematic block diagram of an apparatus for decoding spatial data sets from an encoded representation in accordance with an embodiment of the present invention.

The decoder of FIG. 7 may be implemented by an appropriate processing device, such as a client computer (e.g. PC, laptop or other computing device). The received arc-band bit-stream and sub-band bit-stream are processed to produce a decoded spatial data set, in accordance with the intervening blocks.

There are a number of applications and embodiments of the present invention. Embodiments can be used to produced compressed data from depth maps, for the production of 3D images or 3D video. Motion maps may also be processed to compress motion information, and other applications.

Embodiments of the present invention allow coding of breakpoints in a scalable fashion both for purposes of a resolution (few through to many breakpoints) or for purposes of quality (identifying the most critical breakpoints be transmitted).

Embodiments also enable optimization of resolution and the bit cost (number of information bits to be transmitted).

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for encoding spatial data sets, comprising a hierarchically organized set of breakpoints that identify discontinuities that may exist on the arcs formed between points on a hierarchical grid, the steps of performing a breakpoint dependent transformation of the spatial data samples, the step of scalable encoding of the transformed spatial data samples, the step of partitioning the breakpoints into one subset known herein as vertex breakpoints and another subset of non-vertex breakpoints, the step of scalable encoding of the vertex breakpoints, such that their locations are successively refined by the appearance of progressively more bits from an embedded bit-stream, and the step of inferring the locations of the non-vertex breakpoints from vertex breakpoints in coarser levels of the hierarchy or the same level of the hierarchy.

2. The method of claim 1, wherein vertex breakpoints are assigned non-zero numerical values, herein known as vertex values, that identify the location of the vertex within its arc, and arcs that contain no vertex breakpoint are assigned a vertex value of zero, wherein the vertex values are subjected to an embedded bit-plane coding procedure, such that successive bit-planes of the representation provide successively more accurate information about the location of vertex breakpoints.

3. The method of claim 2, wherein the vertex values are integers, with a sign-magnitude representation, where the most significant non-zero magnitude bit identifies the presence of a vertex breakpoint, the sign bit identifies whether the vertex breakpoint occurs in a first or a second half of the arc's line segment, and each successively less significant bit of the magnitude representation, after the first non-zero magnitude bit, refines the location of the breakpoint by a factor of two.

4. The method of claim 1, wherein the hierarchical grid is organized into levels, such that the grid points in each level correspond to the sample locations in the spatial data set whose horizontal and vertical coordinates are both divisible by a whole number known herein as the level divisor, wherein the hierarchical grid has a dyadic structure, in which the finest level of the hierarchy has a level divisor of one, the second finest level of the hierarchy has a level divisor of two, and so forth, each successive level having a level divisor that is twice as large as that of the next finer level.

5. The method of claim 4, wherein the arcs formed in each level consist of non-root arcs and root arcs, where the non-root arcs are formed between end grid-points that are two grid points apart and have coordinates that are both divisible by twice the level divisor, while the root-arcs are formed between end grid-points that are two grid points apart with one coordinate divisible by twice the level divisor, but not the other coordinate, this means that the line segments that connect the end grid points of both root arcs and non-root arcs have horizontal and vertical orientations on the grid; moreover root arcs appear in intersecting pairs, such that the horizontal and vertical root arcs in each intersecting pair have their line segments bisected by a grid point whose coordinates are both odd multiples of the level divisor.

6. The method of claim 5, wherein each non-root arc that has no vertex breakpoint of its own is assigned an inferred non-vertex breakpoint at the same location as a breakpoint on the arc from the next coarser level of the hierarchy whose line segment contains that of the non-root arc, herein known as the non-root arc's parent arc, except where said parent arc does not exist or has no breakpoint, wherein non-vertex breakpoints are inferred on one or both of the root arcs in an intersecting pair, based on the occurrence and locations of breakpoints within the four adjoining non-root arcs in the same level of the hierarchy.

7. The method of claim 4, wherein the breakpoint dependent transform starts from the finest level of the hierarchy, in which the original spatial data set is used to initialize input samples for each grid point, and progresses to the coarsest level of the hierarchy, performing the following steps for each level:
  (a) the input values at each grid point are transformed into a set of output values at each grid point, using a breakpoint dependent transformation procedure;
  (b) the output values for those grid points whose coordinates are both even multiples of the level divisor are transferred to the corresponding grid points in the next coarser level of the hierarchy, if any, as input values for that level; and (c) the remaining output values for the level are interpreted as subband samples.

8. The method of claim 7, wherein the input values for a level of the hierarchy are transformed into output values through a sequence of prediction steps, where in each prediction step, one subset of the input values is predicted from another subset of the input values, in a manner that depends upon the presence or absence of breakpoints, and the predicted input values are replaced by prediction residuals.

9. The method of claim 7, wherein the grid points of a level are partitioned into cosets and the input values at the grid points belonging to each coset are progressively transformed into output values for the grid points of each coset through a sequence of prediction and update lifting steps, where each lifting step modifies the values within one coset by the addition of a linear combination of values from the other cosets and said linear combination depends upon the presence or absence of breakpoints, wherein three cosets are employed, the first consisting of those grid points whose coordinates are both even multiples of the level divisor, the second consisting of those grid points for which one coordinate is an odd multiple of the level divisor and the other coordinate is an even multiple of the level divisor, and the third consisting of those grid points for which both coordinates are odd multiples of the level divisor, where a first lifting step serves to predict the second coset from the first, a second lifting step serves to update the first coset based on the prediction residuals formed in the second coset by the first lifting step, a third lifting step serves to predict the third coset from the first and second cosets, a final lifting step serves to update the first and second cosets based on the prediction residuals formed in the third coset by the third lifting step, and all lifting steps are dependent on the presence or absence of breakpoints.

10. The method of claim 7, wherein the subband samples from each level of the hierarchy are arranged into two dimensional data arrays, four for the coarsest level of the hierarchy, and three for the other levels, each rectangular array being partitioned into rectangular blocks known as subband code-blocks, where each subband code-block is independently subjected to an embedded bit-plane coding procedure.

11. The method of claim 5, wherein the bit-stream segments produced by successive coding passes of the embedded bit-plane coding procedure for each arc-band code-block are grouped into a succession of arc-band quality layers, wherein the assignment of bit-stream segments to arcband quality layers is performed in such a way as to approximately minimize a lagrangian rate-distortion objective in which the lagrangian parameters are monotonically decreasing from the first to the last quality layer, and the distortion for a quality layer corresponds to the expected squared error distortion of the reconstructed spatial data set when all subsequent arc-band quality layers are unavailable during decoding.

12. A method for determining a hierarchically organized set of breakpoints, so as to minimize a lagrangian rate-distortion objective for the encoding of spatial data sets, where in an encoding procedure:

(a) the breakpoints identify discontinuities that may exist on the arcs formed between points on a hierarchical grid;

(b) the breakpoints affect the behaviour of a transformation that is applied to the spatial data samples and the transformed values are subsequently encoded;

(c) the breakpoints are partitioned into one subset known herein as vertex breakpoints and another subset of non-vertex breakpoints;

(d) the locations of the vertex breakpoints are encoded; and (e) the non-vertex breakpoints are inferred from vertex breakpoints in coarser levels of the hierarchy or the same level of the hierarchy, wherein the method comprises the steps of:

(a) determining a set of breakpoints that minimize a lagrangian rate-distortion objective for coding spatial data sets at the finest level of the hierarchy, marking these as vertex breakpoints unless determined otherwise by subsequent steps;

(b) determining a set of candidate breakpoints at the next coarser level of the hierarchy, such that these candidate breakpoints minimize an energy objective, related to the magnitude of the transformed values that are to be encoded;

(c) determining a subset of the candidate breakpoints that minimize a lagrangian rate-distortion objective when considered as vertex breakpoints, considering the possibility of discarding vertex breakpoints that were determined in previous steps corresponding to finer levels, and also considering the non-vertex breakpoints that are induced by vertex breakpoints in the current level;

(d) performing the above step in a manner where the lagrangian rate-distortion is evaluated and optimized only within a first set of spatial regions within a given level of the hierarchy, after which the vertex breakpoints found for those selected spatial regions are fixed and the optimization is continued within a second set of spatial regions;

(e) repeating steps b to d for each successively coarser level of the hierarchy.

13. The method of claim 12, wherein the first set of spatial regions consists of square regions that resemble the white squares on a chess boards, while the second set of spatial regions consists of square regions that resemble the black squares on a chess board, wherein each square region contains two interior arcs and four boundary arcs from the level of the hierarchy that is being considered, where the lagrangian rate-distortion objective is optimized independently for each square region belonging to the first set of spatial regions.

14. The method of claim 13, wherein the lagrangian rate-distortion objective is optimized independently for each square region belonging to the second set of spatial regions, having fixed the boundary arc breakpoints found while optimizing the first set of square regions, so that only the breakpoints for interior arcs are optimized for this second set of regions.

15. A method for decoding spatial data sets from an encoded representation that involves a hierarchically organized set of breakpoints that identify discontinuities that may exist on the arcs formed between points on a hierarchical grid, the method comprising the step of decoding the locations of a subset of the breakpoints, herein known as vertex breakpoints, the step of inferring the remaining breakpoints, herein known as non-vertex breakpoints, based on the locations of vertex breakpoints in coarser levels of the hierarchy or the same level of the hierarchy, the step of decoding transformed spatial data values, and the step of performing breakpoint dependent inverse transformation of the transformed spatial data values, so as to recover spatial data sample values.

16. The method of claim 15, wherein vertex breakpoints are assigned non-zero numerical values, herein known as vertex values, that identify the location of the vertex within its arc, and arcs that contain no vertex breakpoint are assigned a vertex value of zero, wherein the vertex values are integers, with a sign-magnitude representation, where the most significant non-zero magnitude bit identifies the presence of a vertex breakpoint, the sign bit identifies whether the vertex breakpoint occurs in a first or a second half of the arc's line segment, and each successively less significant bit of the magnitude representation, after the first non-zero magnitude bit, refines the location of the breakpoint by a factor of two, the vertex values are decoded using an embedded bit-plane decoding procedure.

17. The method of claim 15, wherein the hierarchical grid is organized into levels, such that the grid points in each level correspond to the sample locations in the spatial data set whose horizontal and vertical coordinates are both divisible by a whole number known herein as the level divisor, wherein the hierarchical grid has a dyadic structure, in which the finest level of the hierarchy has a level divisor of one, the second finest level of the hierarchy has a level divisor of two, and so forth, each successive level having a level divisor that is twice as large as that of the next finer level.

18. The method of claim 17, wherein the arcs formed in each level consist of non-root arcs and root arcs, where the non-root arcs are formed between end grid-points that are two grid points apart and have coordinates that are both divisible by twice the level divisor, while the root-arcs are formed between end grid-points that are two grid points apart with one coordinate divisible by twice the level divisor, but not the other coordinate, this means that the line segments that connect the end grid points of both root arcs and non-root arcs have horizontal and vertical orientations on the grid; moreover root arcs appear in intersecting pairs, such that the horizontal and vertical root arcs in each intersecting pair have their line segments bisected by a grid point whose coordinates are both odd multiples of the level divisor.

19. The method of claim 17, wherein the breakpoint dependent inverse transform starts from the coarsest level of the hierarchy and progresses to the finest level of the hierarchy in which output values at each grid point correspond to the decoded spatial data set, performing the following steps for each level:

(a) input values for those grid points whose coordinates are both even multiples of the level divisor are obtained from the output values produced at the corresponding grid points in the next coarser level of the hierarchy, if any;

(b) input values for the remaining grid points in the level are obtained from the decoded transformed spatial data sample values; and (c) the input values at each grid point are transformed into a set of output values at each grid point, using a breakpoint dependent inverse transformation procedure.

20. The method of claim 19, wherein the grid points of a level are partitioned into cosets and the input values at the grid points belonging to each coset are progressively transformed into output values for the grid points of each coset through a sequence of update and prediction lifting steps, where each lifting step modifies the values within one coset by the addition of a linear combination of values from the other cosets and said linear combination depends upon the presence or absence of breakpoints, wherein three cosets are employed, the first consisting of those grid points whose coordinates are both odd multiples of the level divisor, the second consisting of those grid points for which one coordinate is an odd multiple of the level divisor and the other coordinate is an even multiple of the level divisor, and the third consisting of those grid points for which both coordinates are even multiples of the level divisor, where a first lifting step serves to update the first and second cosets based on the sample values in the third coset, a second lifting step serves to add predicted values from the updated first and second cosets to the third coset, a third lifting step serves to update the first coset based on updated values found in the second coset, a final lifting step serves to add predicted values from the updated first coset to the updated second coset, and all lifting steps are dependent on the presence or absence of breakpoints.

* * * * *